(12) United States Patent
Wu et al.

(10) Patent No.: US 8,909,292 B2
(45) Date of Patent: Dec. 9, 2014

(54) COMMUNICATION APPARATUS AND METHOD FOR DISPLAYING MAN-MACHINE INTERFACE MMI

(71) Applicant: MediaTek Singapore Pte. Ltd., Singapore (SG)

(72) Inventors: Min Wu, Beijing (CN); Liang-Yen Lin, Chiayi (TW)

(73) Assignee: MediaTek Singapore Pte. Ltd., Singapore (SG)

(*) Notice: Subject to any disclaimer, the term of this patent is extended or adjusted under 35 U.S.C. 154(b) by 107 days.

(21) Appl. No.: 13/773,865

(22) Filed: Feb. 22, 2013

(65) Prior Publication Data
US 2013/0225239 A1    Aug. 29, 2013

(30) Foreign Application Priority Data

Feb. 23, 2012  (CN) .......................... 2012 1 0044773
Jan. 10, 2013  (CN) .......................... 2013 1 0009107

(51) Int. Cl.
*H04B 1/38*   (2006.01)
*H04M 3/00*   (2006.01)
*H04W 88/06*  (2009.01)
*H04M 1/725*  (2006.01)

(52) U.S. Cl.
CPC .......... *H04W 88/06* (2013.01); *H04M 1/72519* (2013.01)

USPC .................... 455/558; 455/557; 455/418

(58) Field of Classification Search
CPC ..... H04W 4/001; H04W 4/003; H04W 88/06; H04W 92/08; H04B 1/3816; H04B 2250/14
USPC ................. 455/556.1, 557, 558, 418
See application file for complete search history.

(56) References Cited

U.S. PATENT DOCUMENTS

| | | | |
|---|---|---|---|
| 2005/0181829 A1* | 8/2005 | Cho et al. ................... | 455/558 |
| 2008/0064443 A1* | 3/2008 | Shin et al. .................. | 455/558 |
| 2008/0153546 A1* | 6/2008 | Gupta et al. ................ | 455/558 |
| 2010/0159988 A1* | 6/2010 | Lee ............................ | 455/558 |
| 2010/0248782 A1* | 9/2010 | Cheon ........................ | 455/558 |
| 2011/0117964 A1* | 5/2011 | Luo ............................ | 455/558 |
| 2012/0094718 A1* | 4/2012 | Kim ........................... | 455/559 |
| 2012/0115545 A1* | 5/2012 | Middleton .................. | 455/558 |
| 2012/0135715 A1* | 5/2012 | Kang et al. ................. | 455/412.1 |

* cited by examiner

*Primary Examiner* — San Htun
(74) *Attorney, Agent, or Firm* — McClure, Qualey & Rodack, LLP

(57) ABSTRACT

A communication apparatus and a method for providing a predetermined subscriber identification module (SIM) card are provided. The communication apparatus provides different man-machine interfaces (MMIs) according to a number of the inserted SIM cards. The communication apparatus includes a detector arranged to detect an amount of the inserted SIM cards on the communication apparatus, and a processor arranged to provide different MMIs according to the amount of inserted SIM cards.

14 Claims, 29 Drawing Sheets

Calling (a predetermined SIM card) | SIM X

FIG. 11b

COMMUNICATION APPARATUS AND METHOD FOR DISPLAYING MAN-MACHINE INTERFACE MMI

CROSS REFERENCE TO RELATED APPLICATIONS

This Application claims priority of China Patent Applications No. 201210044773.0 filed on Feb. 23, 2012 and No. 201310009107.8 filed on Jan. 10, 2013, the entirety of which is incorporated by reference herein.

BACKGROUND OF THE INVENTION

1. Field of the Invention

The present invention relates to a communication apparatus with a plurality of user identification cards, and in particular, relates to a multi-card communication apparatus and a method for displaying MMI thereof 2. Description of the Related Art In accordance with the needs and developments of the all-around access calculating and internet, various kinds of wireless communication technologies have been developed, such as GSM, GPRS, EDGE, UMTS, W-CDMA, CDMA2000, TD-CDMA, WiFi, WiMAX, LTE, LTE-A and TD-LTE. Generally, one mobile phone can only support one wireless communication technology. Regardless of the location, a smart and continuous mobile communication can be provided to the subscriber by the supported wireless communication technology. However, in the modern business society, mobile phones have become necessary tools for efficient business communications. Especially for a businessman, having another mobile phone for business proposes has become necessary. Carrying another mobile phone can be a good choice to save or manage the charge fees of a wireless service. However, it may be inconvenient to carry another mobile phone, and the inter-switching between mobile phones can be another problem. Multi-card mobile phones have been developed to provide a convenient option for multi-user identification cards. Multi-card mobile phones are featured by two or more wireless communication modules, and each of the communication modules utilizes an independent user identification card respectively for transmission and receiving of the communication apparatus. Multi-card technology allows users to set up communications and receive a call simultaneously or non-simultaneously. Therefore, multi-card mobile phones are suitable for business or family users, or for travelers between different cities and countries.

Multi-card mobile phones can meet the needs of using a plurality of user identification cards, however, so far the design of multi-card mobile phones are not friendly. Traditionally, regarding mobile phones having several sockets, the options corresponding to user identification cards are displayed on the interface of the mobile phone. The socket not inserted by a user identification card can be displayed by a grey color to indicate that this user identification card has not been initiated. Similarly, on an actual application or scenario, several options of the cards are all displayed at an MMI (Man-Machine Interface) in an arranged form. The importance, user preference and user status can not be displayed between several cards. Particularly, the lack of the correlation between the functional charts of the several cards is not smart for the options of users. Specifically, when the user wants to select a functional application, a predetermined user identification card can be recommended by the traditional technology. During the operation of user identification cards, the user has to make a choice on an option menu. This traditional design does not analyze the operating scenarios of users for processing the possible preference of similar operations. For many subscribers having the needs of multi-card mobile phones, their needs have not been satisfied.

BRIEF SUMMARY OF THE INVENTION

A detailed description is given in the following embodiments with reference to the accompanying drawings.

The present invention provides a communication apparatus equipped with a plurality of subscriber identification module (SIM) cards. The communication apparatus provides a display of a man-machine interface (MMI) according to a number of the inserted SIM cards. The communication apparatus comprises a detector arranged to detect an amount of the inserted SIM cards on the communication apparatus, and a processor arranged to provide different MMIs according to the amount of inserted SIM cards.

The present invention provides a method to recommend predetermined SIM cards for a communication apparatus equipped with a plurality of SIM cards. The method comprises recording the utilization record of a scenario by a subscriber and detecting whether a previously used SIM card corresponding to the scenario exists. If existing, the previously used SIM card corresponding to the scenario is set to be the predetermined SIM card and the predetermined SIM card is recorded.

The present invention provides a communication apparatus equipped with a plurality of SIM cards. The communication apparatus provides an adaptive application controller according to a number of the inserted SIM cards. The communication apparatus comprises a detector and a processor. The detector is utilized to detect a selection signal selected by the subscriber for application. The processor provides an application controller on an MMI corresponding to the application according to the amount of the inserted SIM cards.

The present invention provides an MMI display method applied to a communication apparatus according to a number of the inserted SIM cards. The communication apparatus is equipped with a plurality of SIM cards. The MMI display method comprises detecting an amount of the inserted SIM cards on the communication apparatus and providing different MMIs according to an amount of inserted SIM cards.

The present invention provides an MMI display method applied to a communication apparatus wherein an application of the communication apparatus has a plurality of operational options. The MMI display method comprises detecting an amount of the operational options and changing an application controller according to the amount of the selected operational options.

The multi-card communication apparatus having the MMI display method can provide a more flexible MMI display method for convenient selection and operation by a subscriber.

The present invention can be more fully understood by reading the subsequent detailed description for those skilled in the art.

BRIEF DESCRIPTION OF THE DRAWINGS

The present invention can be more fully understood by reading the subsequent detailed description and examples with references made to the accompanying drawings, wherein:

FIG. 11b is a diagram of the application controller;

DETAILED DESCRIPTION OF THE INVENTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is electrically connected to another device, that connection may be through a direct electrical connection, or through an indirect electrical connection via other devices and connections. The following description is of the best-contemplated mode of carrying out the invention. This description is made for the purpose of illustrating the general principles of the invention and should not be taken in a limiting sense. The scope of the invention is best determined by reference to the appended claims.

Figure 1:
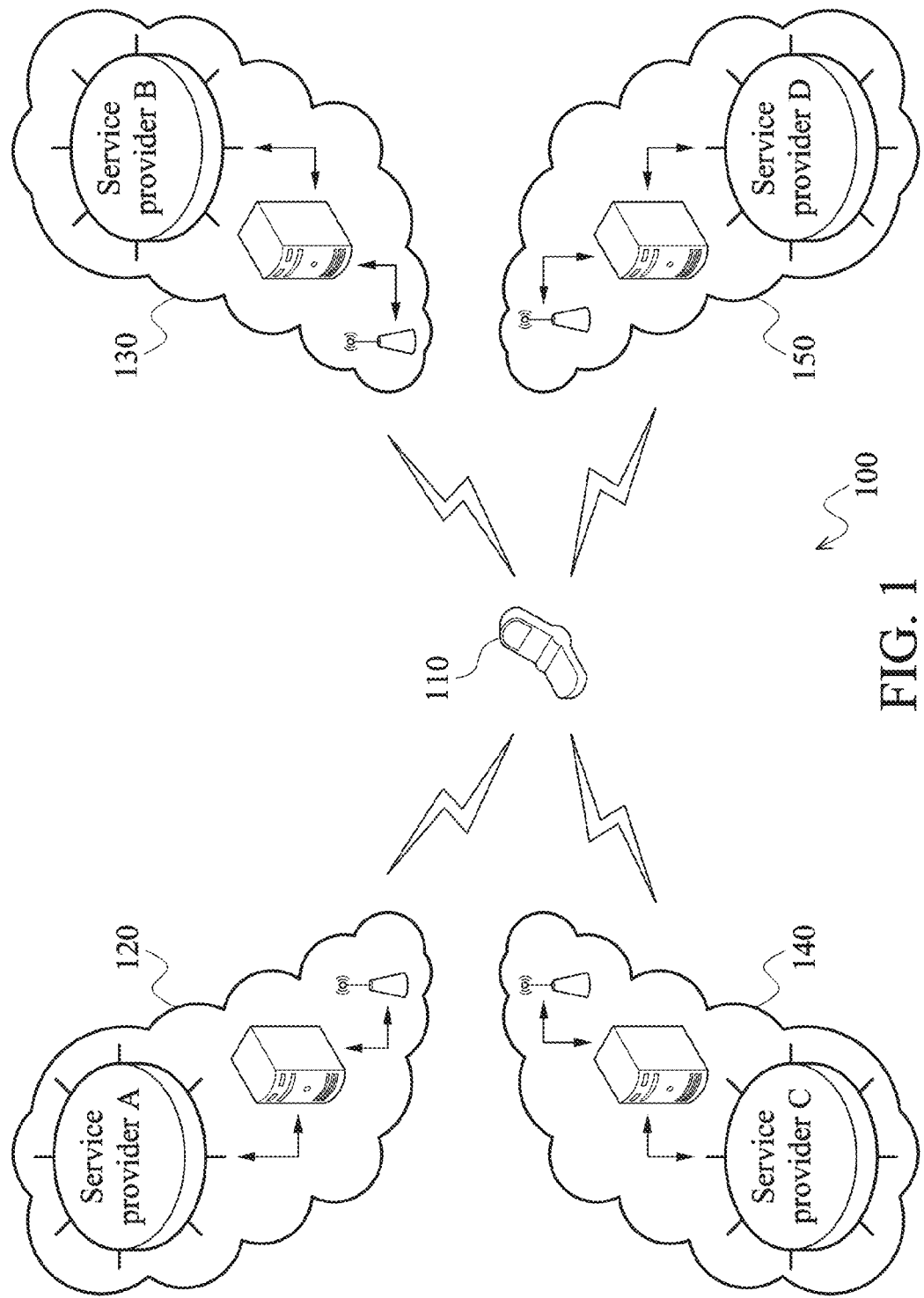
FIG. 1 is a block diagram illustrating an environment of a wireless communication according to the present invention.

FIG. 1 is a block diagram illustrating an environment of the wireless communication 100 according to the present invention. The environment of the wireless communication 100 includes a Mobile Station (MS) 110 and service internets 120, 130, 140, 150. It should be noted that although the present embodiment takes the MS as a sample for explanation, however, any kind of terminal apparatuses or servers equipped with user identification cards, such as mobile terminals, tablets and PDAs, are within the scope of the MS 110, and the present invention is not limited thereto. The MS 110 can be equipped with a plurality of wireless communication modules and/or related user identification cards. The user identification cards enable the MS 110 to communicate with service internets having the same or different wireless communication technical RAT. When the MS 110 camps on one to four cells, the MS 110 can perform wireless communications with service internets 120, 130, 140 and 150 through one to four separate user numbers and/or four separate user identification cards. The Cell can be an enhance base station (EBS), the node B, base station (BS) and advanced base station (ABS). Service internets 120, 130, 140 and 150 may obey any of the wireless communication technologies as follows: GSM/GPRS/EDGE, WCDMA, CDMA 2000, UMTS, TD-SCDMA, WiFi, WiMAX, LTE, LTE-A and TD-LTE. The separate one to four user identification cards may obey the technical specifications of the service internets 120, 130, 140 and 150 or other specifications such as WiFi or WiMAX. For WiFi and WIMAX users, user identification cards are not necessary, but the user must provide a user name and a password. For example, the service internet 120 can be a GSM/GPRS/EDGE system. Accordingly, one of the user identification cards can be a Subscriber Identity Module (SIM) card, and the service internet 130 can be WCDMA, UMTS, LTE or TD-LTE systems. Accordingly, another user identification card can be a USIM card. The service internet 140 can be a CDMA 2000 system. Accordingly, another user identification card can be an R-SIM card. The service internet 150 can be a WIMAX system. Accordingly, the user needs to provide a dongle or a user name and a password. The four user identification cards equipped by the MS 110 are taken as examples. In another embodiment, according to different designs and needs, the MS 110 can be equipped with two or three or more user identification cards to adapt to the two or three or more wireless communication technologies. The user identification cards of the following one or more embodiments of the present invention take SIM cards as examples. It can be understood by those skilled in the art that the SIM cards can be USIM cards, or R-USIM cards and not be limited to SIM cards. Typical one SIM card can include the information of the user account, user identification codes of international movements, and a set of SIM application toolkit (SAT). The SIM card can provide storage spaces for the contact book of the contacts. The processor of the baseband modulation can interact with the MCU of the SIM card to obtain information or SAT commands from the inserted SIM card. The SIM card can be displayed on the customized user menu by the program design. On the phone and communication internet of the UMTS (also called 3G), MS 110 can be inserted by a USIM card. The USIM card stores the account information of the user, IMSI, certification information and a set of the USIM Application Toolkit (USAT). The USIM card can provide the storage space for the text information and the contact book of the contacts. Information or SAT commands can be obtained from the inserted USIM card by utilizing the MCU of the USIM card. The storage space of the phone book of the USIM card can be larger than that of the SIM card. In order to achieve the purpose of certification, a USIM card can store a long-term preshared secret key K, which is in common-use with the Authentication Center (AuC) of the internet. Within a certain range, the MCU of the USIM can certificate a serial number to avoid callback attacks by using window mechanisms, and generate a session key CK and IK both used in the partial cipher and complete an algorithm of KASUMI (also called A5/3) of the UMTS system. Program designs can be performed immediately after the USIM card is inserted into the MS 110.

The MS 110 can wirelessly access the resources of the interconnect internet and perform the request of information transmission such as e-mail transmission, Web browsing, file uploading/downloading, real-time information, video streams or others. The MS 110 can also perform the wireless call, such as a VoIP call, IP Multimedia Subsystem (IMS) call, CS call or others. In addition, the host computer or the notebook can connect to the MS 110 and wirelessly access the resources of the interconnect internet. Since the MS 110 is equipped with one or more SIM cards and/or USIM cards, the MS 110 can operate at an idle mode or a connection mode for each inserted SIM card and/or USIM card on the internet of GSM/GPRS/EDGE, WCDMA, CDMA 2000, UMTS, TD-SCDMA, WiFi, WiMAX, LTE, LTE-A and TD-LTE.

Figure 2:
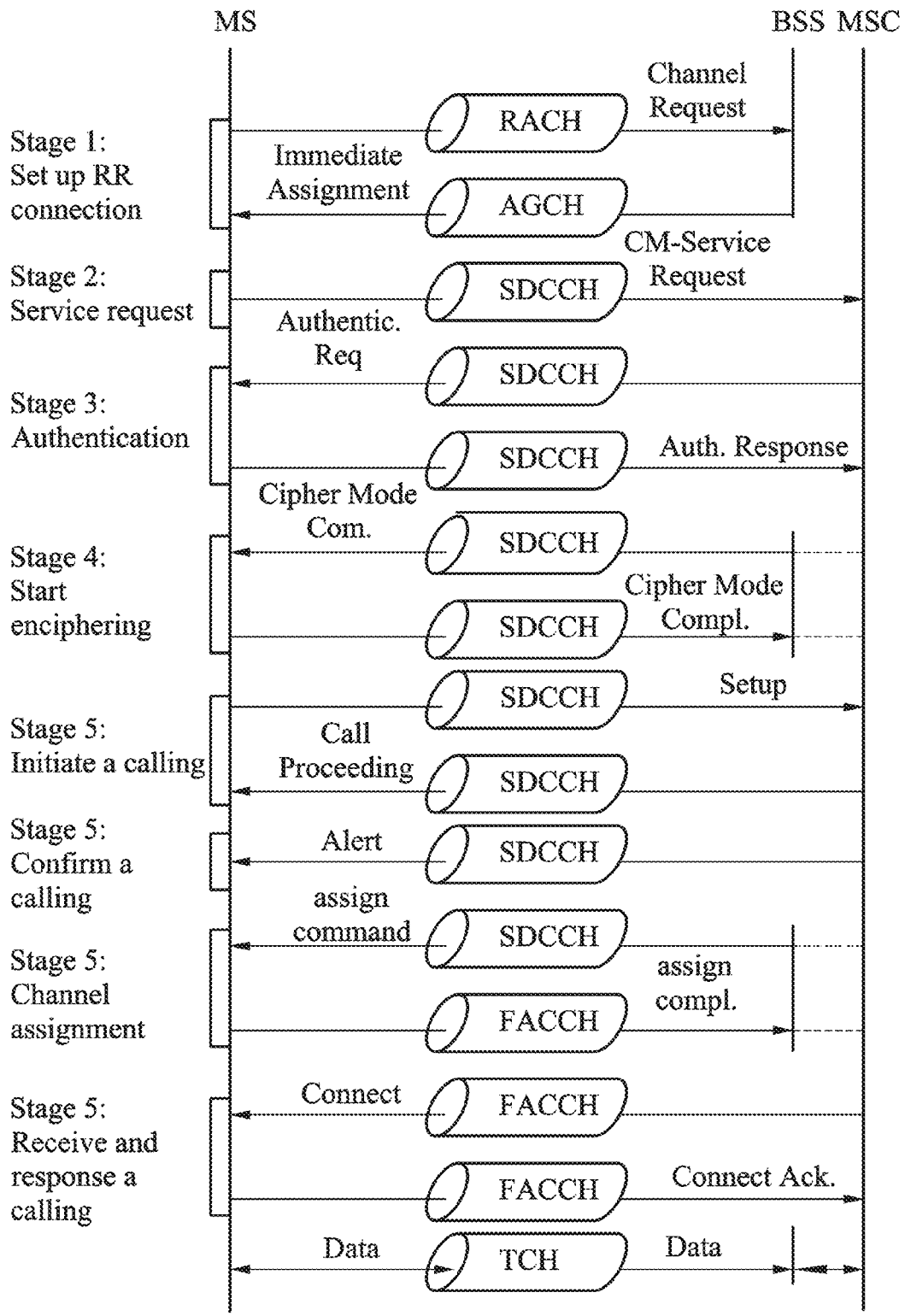
FIG. 2 is a diagram illustrating a logic channel distribution and a signaling procedure of a communication request initiated by a device.

FIG. 2 is a diagram illustrating a logic channel distribution and signaling procedure of a communication request initiated by a device. In a GSM communication system, the communication request initiated by a device can be called a Mobile Originated (MO) communication request, such as a voice communication request. In a GSM communication system, the Call Control (CC) includes the procedure of initiating, controlling and terminating the communication service, and the CC is also a factor of the Connection Management CM. When the MS 110 is arranged to set up a communication service, such as initiating a voice call service, the entity of the CC sends a channel request through a Random Access Channel (RACH) at first, and the entity of Mobility Management (MM) (stage one) requests an MM connection. Regarding a standard call, the MS 110 may need a registration of the wireless internet. However, registration is just an option for an emergency call. In other words, the emergency call initiated by the MS 110 can be developed on the connection of the un-enciphered Radio Resource (RR) from the MS 110, while the MS 110 does not register on the wireless internet. The Base Station System (BBS) of the wireless internet can distribute the Stand-alone Dedicated Control Channel (SDCCH) or the Traffic Channel (TCH) through the loaded Immediate Assignment of the Access Grant Channel (AGCH). After the procedure of sending the CM service request (stage 2), the SDCCH can be passed through, and the certification (stage 3) and the cipher (stage 4) can be finished by the MSC, and the MM connection will be developed. During the certification stage, it is needed to send an authentication request, and the certification will finish after receiving the authentication response. During the cipher stage, it is needed to send a request of the cipher mode complete, and the response of the cipher mode complete will be obtained after receiving the authentication response. After the MM connection and the successful development of the cipher of the user information, the entity of the service request CC will be informed. Then, the transmission signals in the MM connection are used to develop connections with the entity of the CC of the Mobile Switching Center (MSC). The procedure disclosed above is called a SETUP. The MSC can reply to the connection request by several different methods. The MSC can utilize a call proceeding (stage 5-1) to indicate that the call request has been received and all of the necessary information of developing a call has been obtained. Otherwise, the call request can be declined by a release complete. Then, when the MSC attempts to connect to the called station, the MS 100 receives the alert information (stage 5-2). Once the called station sends the indicating information and receives a call, the MS 110 receives the assign command. After the MS 110 responds to the distributing complete information through the Fast Associated Control Channel (FACCH), the MS 110 will distribute a dedicated channel, which is assign complete (stage 5-3). Then, after receiving the connect information from the MSC (stage 5-4), the MS 110 responds to the information of connect acknowledge (ack). The service channel successfully developed on the TCH and MS 110 can start a communication, i.e. transmit data to each other, with the called station at once. It should be noted that the CC procedure of the WCDMA or TD-SCDMA communication system are similar to the CC procedure of the GSM communication system, and are also similar to the CC procedure of the present technology. Therefore, the procedure will not be interpreted again. It can be understood that FIG. 2 illustrates the previous distribution, but the present invention is not limited thereto. The person skilled in the art can understand that the distributions listed on the file are the known distributions or the existed distributions.

Figure 3:
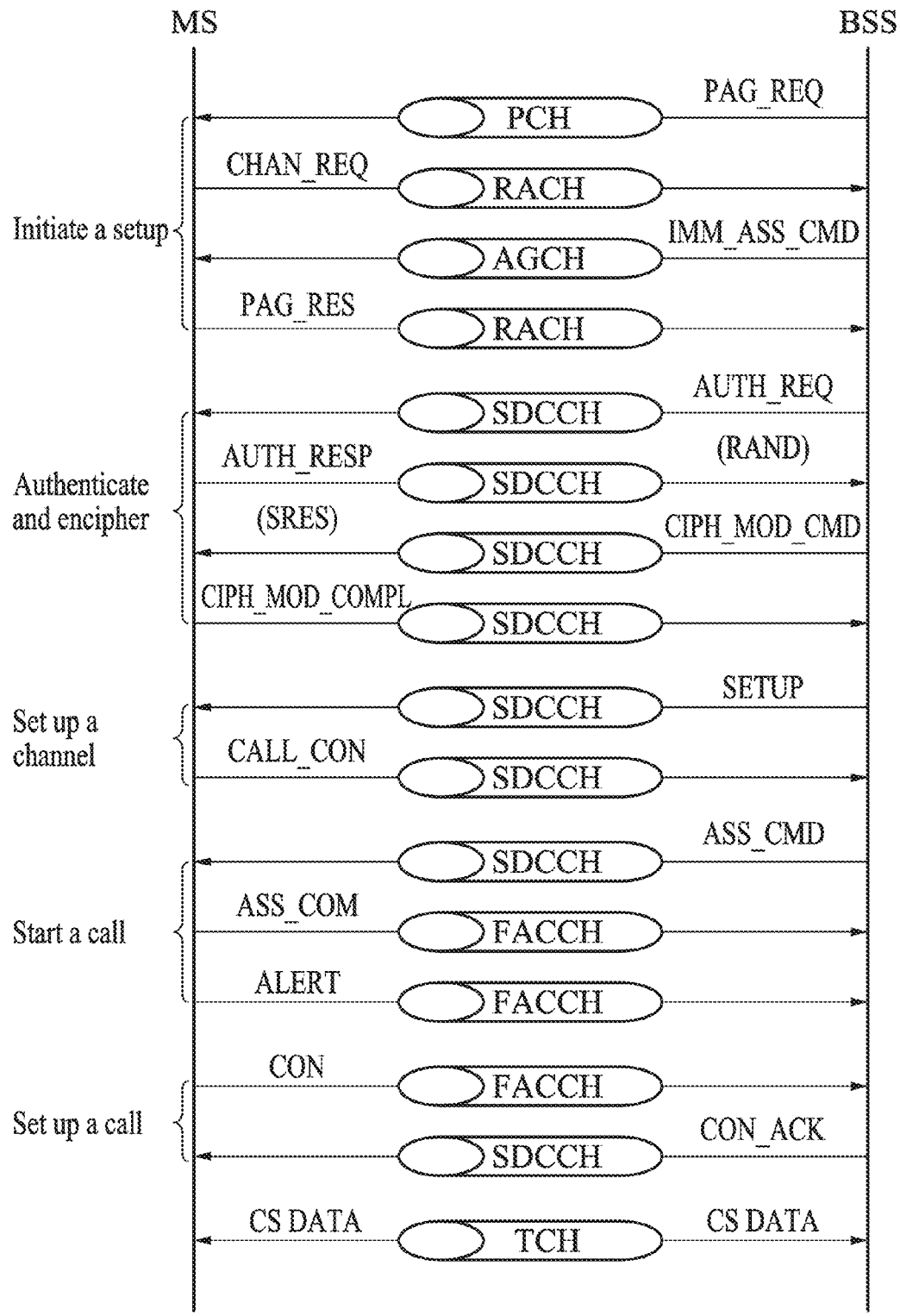
FIG. 3 is a diagram illustrating a calling procedure of the Mobile-Terminated (MT) of the GSM system.

FIG. 3 is a diagram illustrating a call procedure of a Mobile-Terminated (MT) of a GSM system. The MT call means that the MS has received a call initiated outside of the PLMN, or received a call inside of the PLWM and plays the role of a receiver. If a MS is attempted to be called, i.e., MT call, the MSCNLR can assign BBS to page the MS. Since the MSCNLR does not certainly know that the BSC and BTS are monitored by the MS, the page information can pass through all of the Location Area (LA) and be transmitted. The MS receives the Page Request (PAG_REQ) on the Page Channel (PCH), and identifies the call information to be used by itself based on the TMSI or IMSI. Then, the MS can transmit the information of the Channel Request (CHAN_REQ) on the RACH. Then, the BSS transmits the information of the Immediate Assignment Command (IMM_ASS_CMD) on the AGCH to be a response, and the information is the Stand-Alone Dedicated Control Channel (SDCCH) distributed by the MS and is used for system signal transmission before the TCH distribution. At this point, the internet does not know that the MS is the paging target MS. The internet only knows that the MS will access the internet. The MS immediately switches to the distributed SDCCH, transmits the Paging Response (PAG_RES) on the SDCCH, and receives the information of IMM_ASS_CMD indicating the internet that the MS is responding to its calling information. The description of the procedure of the initial setup of the MT calling is finished.

The internet needs to make a request to the MS for authentication ciphering before the MS provides any service for the MS. The BSS sends the information of the Authentication Request (AUTH_REQ) including the random number (RAND) to the MS, and the RAND is a 128-bits random number generated by the HLR for authentication. The MS calculates an appropriate signed response (SRES) based on the RAND. The RAND is sent by the MS, and the MS loads the SRES into the information of AUTH REQ and sends to the BSS. The BSS authenticates the SRES and admits it to access the internet if the SRES is correct and the MS is authenticated. Once the MSC/VLR authenticates the MS, it can command the BBS and the BS to use information of the CIPH_MOD_CMD and switch to an authentication mode. Once the MS is on the authentication mode, the VLR usually assigns a new TMSI to the MS.

Once the MS has been authenticated and is on the authentication mode, the MSC can send a SETUP information through the SDCCH to the BBS and initiate the channel setup. The BSS can forward the SETUP information to the MS on the assigned SDCCH. The SETUP information can include a Calling Line Identification Presentation (CLIP), which is actually the ID of the calling line. The MS can respond the SETUP information by sending the Call Confirmed (CALL_CON) information indicating that the MS can set up the requested connection and the CALL_CON information can be forwarded to the MSC by the BSS. Then the BSS executes the procedure of the call setup by sending the information of the Assignment Command (ASS_CMD) assigning the call channel TCH to the MS on the assigned SDCCH. The MS can switch to the TCH immediately and regard the Assignment Complete (ASS_COM) information on the FACCH as a response (all of the information sent on the call channel are actually loaded on the FACCH, and the FACCH comes from the time slot used by the TCH for sending information). Once the TCH is initiated, the MS starts to ring. After receiving the ASS_COM information, the MS can send the ALERT information to the MSC on the FACCH. The BSS can forward the ALERT information to the calling line through the PSTN, and the called line can monitor the rings of the line. Once the subscriber of the MS replies to the call (by pushing the OK button or touching the screen), the MS can send the connect (CON) information to the MSC. The CON information is forwarded back to the calling line to initiate the call. The MSC sends the Connect Acknowledge (CON_ACK) information to the MS to set up a call establishment. The CC of the WCDMA, TD-SCDMA or UMTS system is similar to the CC of the GSM, therefore, the procedure is not described again here for simplicity.

The message of the Short Message Service (SMS) of the MO can be sent from the MS to the Short Message Service Center (SMSC). The SMS message can regard the predetermined fixed internet, mobile subscriber on the Value-Added Service Providers (VASP) and the SIM card as the target receiver. The target receiver receiving the SMS message is also called application-terminated. The message of the MT is transmitted from the SMSC to the target MS. In the GSM system, the complete setup procedure of the Mobility Management (MM) connection needs the transmission of the SMS message, which again assumes the existence on the SDCCH or SACCH is connected with the RR protected by the LAPD. The SMS transmission Protocol Data Unit (PDU) utilizes the RP-DATA information between the MSC and the MC, and transmits information by the SM-RP. Whether correctly receiving and using the RP-ACK information from the SMS service center (forwarded by the mobile setup SMS) is confirmed. In the system of the WCDMA or TD-SCDMA, before transmitting the SMS message, the RRC connection must be set up successfully.

For the GPRS system, the internet based on an IP (such as the global internet or the private/cooperative internet) and the X.25 internet are supported. Before a (U)SIM card of the MS utilizes the GPRS service, the MS needs to implement the procedure of the GPRS attachments to use a (U)SIM card attached to the GPRS internet. The procedure of the GPRS attachment is to indicate the internet about its programs of the existing procedure of the internet. During the procedure of the GPRS attachment, the Service GPRS Support Node (SGSN) sets up the contents of the MM relating to the mobility and the security of the MS.

Figure 4:
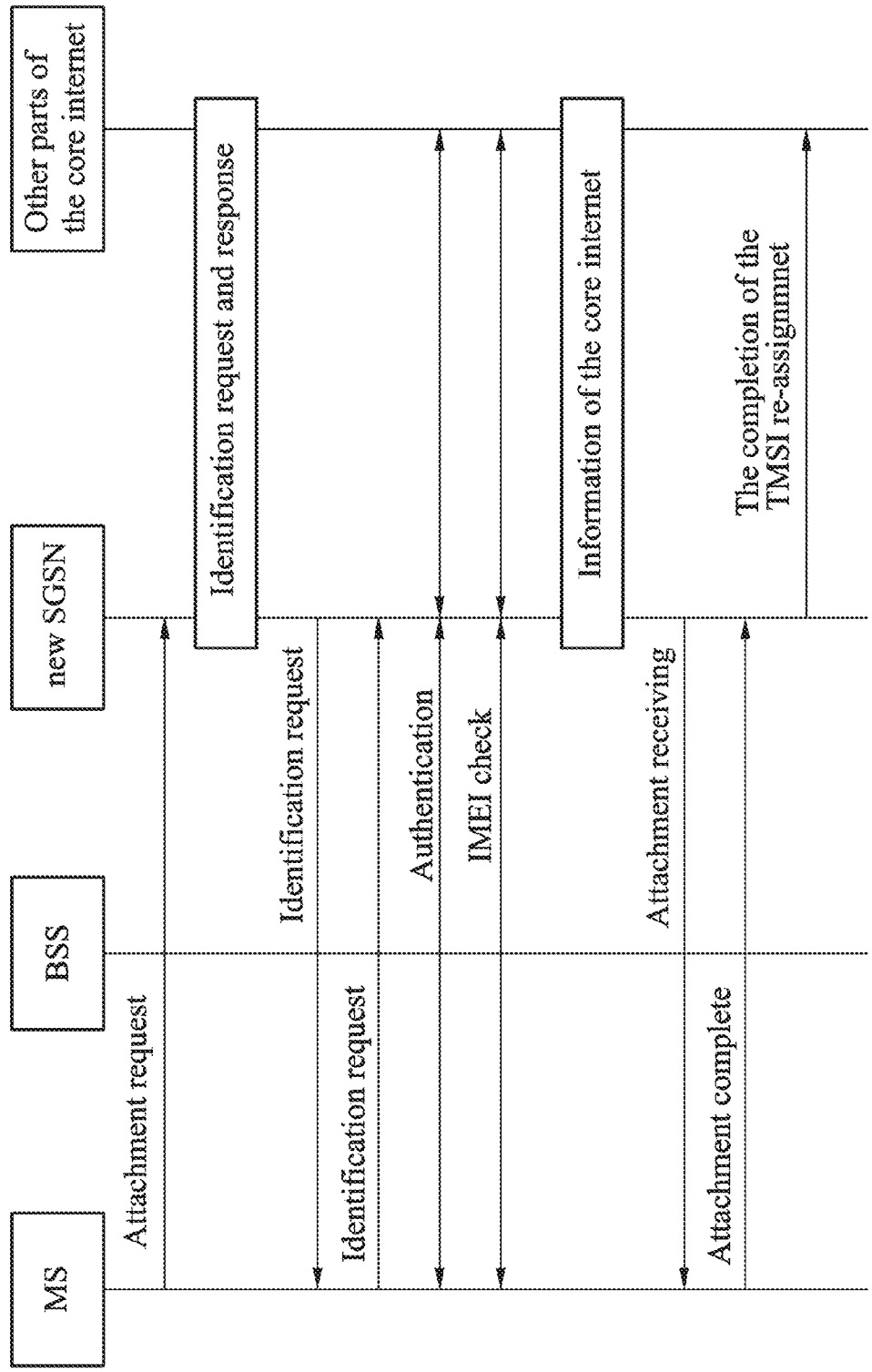
FIG. 4 is a simplified diagram illustrating a combined GPRS/IMSI attach procedure.

FIG. 4 is the simplified diagram illustrating a combined GPRS/IMSI attach procedure. During the procedure of the assembled GPRS/IMSI, the MS sends the attachment request information to the SGSN at first. The attachment request information is sent to the new SGSN including a newly assigned Package-Temporary Mobile Subscriber Identity (P-TMSI) ID or IMSI and information of the location area. The new SGSN queues the old SGSN (the previous attached SGSN) used for the identification of the MS by switching the identification request and the identification response information. Then, the new SGSN requests more information from the MS to authenticate itself by switching the identification request and the identification response information. The authentication procedure similar to FIG. 2 and FIG. 3 is implemented after confirming the identification card of the MS. If the MM content used for the MS exists within the service internet, then the authentication is necessary. After the authentication, an optional IMEI check can be implemented to check the MS apparatus. Then, the information of the core internet is sent. Any content to initiate the PDP of a new SGSN used for the MS is canceled, and the switching information is implemented between the new SGSN and the HLR/VLR to update the position of the MS. The SGSN selects a wireless-first SMS, and sends the information of attach accept (including the P-TMSI, VLR TMSI, P TMSI signature, wireless-first SMS, PS session supporting the IMS voice on the indication, or the emergency service supporting identification symbol) to the MS. If the P-TMSI or VLR TMSI is changed, the MS confirms receiving the TMSI by returning the information of attach accept, and the SGSN confirms the VLR TMSI by transmitting the TMSI re-assignment complete information.

After completing the procedure of the GPRS attachment, in order to change the information package with the outside PDN, the MS applies an address called the Package Data Protocol (PDP) address for the using of the PDN. Because the PDN is an IP internet, the PDP address is an IP address. The PDP content is developed for a session and describes the characteristics of the session. The PDP content describes the type of the PDP (such as IPv4, IPv6 or others). The address of PDP is assigned to the MS. The registration of the requested quality of service (QoS) and the address of the Gateway GPRS Support Node (GPSN) are used as access points with the external internet.

Figure 5:
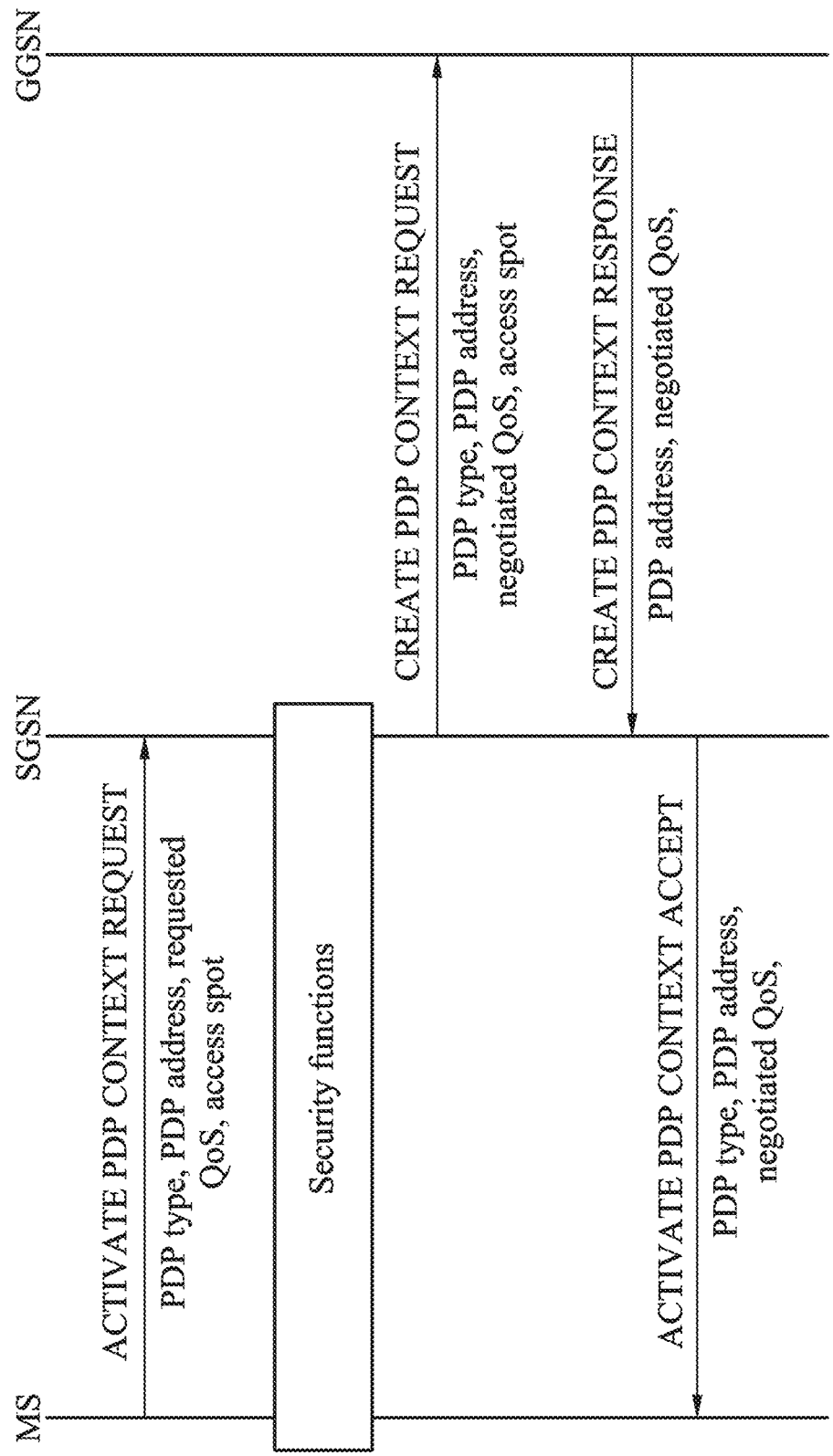
FIG. 5 is a diagram illustrating a initiation procedure of a PDP content initiated by the MS.

FIG. 5 is a diagram illustrating an initiation procedure of a PDP content set up by the MS. The MS informs the SGSN requesting content by using the information of the ACTIVATE PDP CONTEXT REQUEST. Then, a typical GSM security function (such as the authentication of the MS) is implemented. If the access is authenticated, the SGSN sends the information of the ACTIVATE PDP CONTEXT REQUEST to the affected GGSN. Then, the GGSN establishes a new project at the table of the PDP context, and the project enables the GGSN to route information packages between the SGSN and an external PDN. The GGSN utilizes the information of the ACTIVATE PDP CONTEXT REQUEST to confirm the request with the SGSN. Finally, the SGSN updates its table of the PDP context and utilizes the information of the ACTIVATE PDP CONTEXT REQUEST to confirm the initiation of the new PDP content with the MS. It should be noted that for the MS using the CS and the PS service, it is possible to implement the attachment procedure of an assembled GPRS/IMSI. The anti-connection from the GPRS internet is called the anti-attachment of GPRS, and such procedure can be initiated by the MS or the GPRS.

In addition, the IP packages proceed to the transmission after packing in the GPRS internet. The transmission of the IP package is obtained by utilizing the GPRS Tunneling Protocol (GTP). In other words, the GTP packages bear the IP packages of the subscribers. The definition of the GTP is between the GPRS Support Nodes (GSP) within the PLWN and of different PLWNs. The GTP includes the information transmission and the data transmission. During the data transmission, the GTP utilizes the Tunnel mechanism to transmit the data package of the subscriber. During the information transmission, the GTP certifies the Tunnel control and the management protocol. The information transmission is used to set up, amend and cancel the tunnel. The Tunnel Identifier (TID) is composed of the IMSI of the (U)SIM card and the Network Layer Service Access Point Identifier (NSAPI). The PDP content is only indicated by the NSAPI. Under the GTP, the Transmission Control Protocol (TCP) is used to transmit the GTP packages within the backbone internet. On the internet layer, the IP is used to route the information packages between the backbone internets. Take the GSM system for example, After the MS utilizes the (U)SIM card to completely attach the GPRS internet, the cell supporting the GPRS can assign physical channels for the GPRS calls. In other words, the wireless resource of the cell is shared between the MS and the (U)SIM card.

Figure 6:
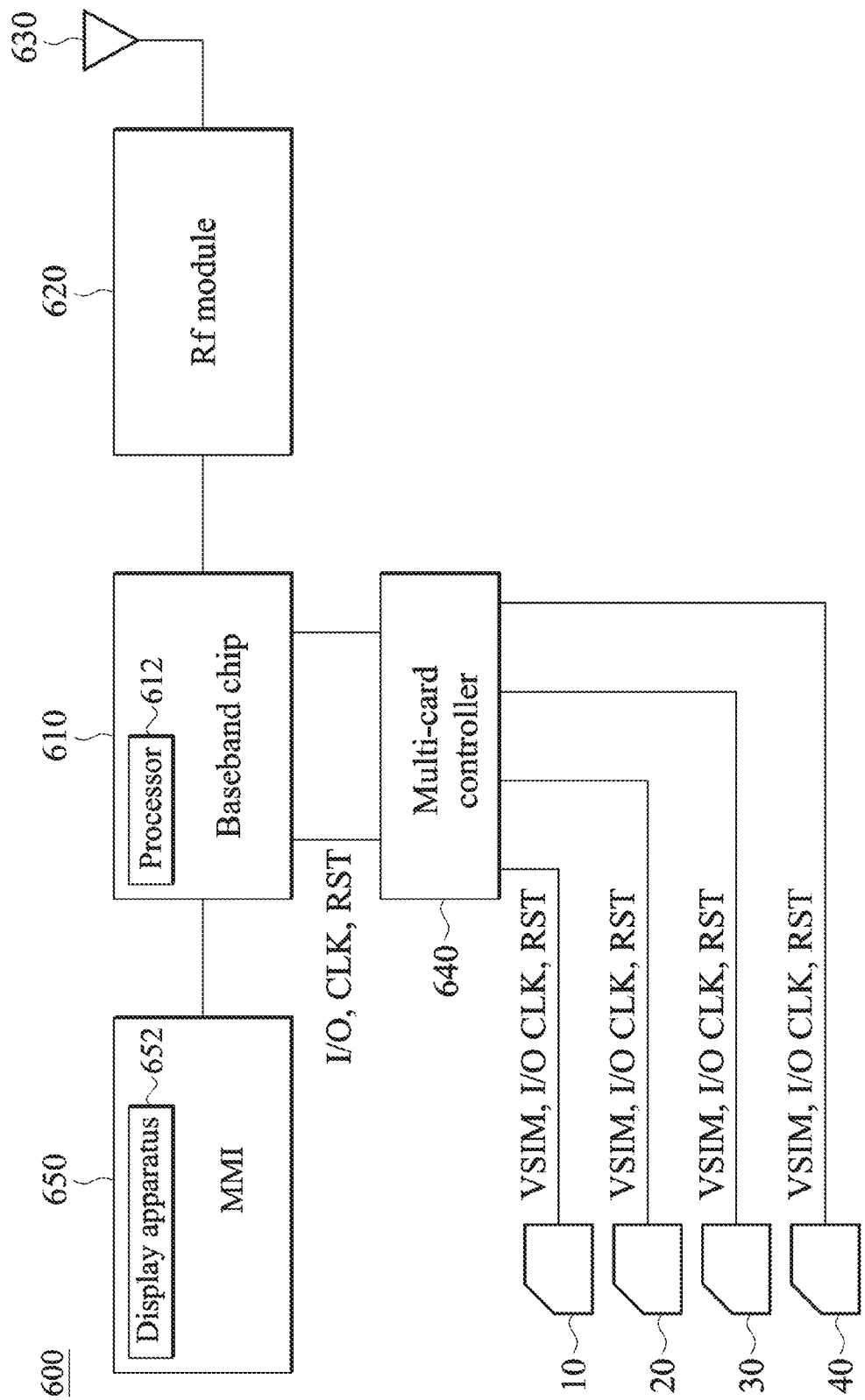
FIG. 6 is a diagram illustrating the hardware architecture of the MS 600 according to an embodiment of the present intention.

FIG. 6 is a diagram illustrating a hardware architecture of the MS 600 according to an embodiment of the present intention. The MS 600 is equipped with a baseband chip 600 and a single RF module 620 coupled to an antenna 630. The baseband chip 610 comprise a plurality of hardware components to implement the processing of baseband signals including ADC/DAC, gain adjustment, modulating/demodulating, coding/decoding, and so on. Specifically, the baseband chip 610 comprises a processor 612. In an embodiment, the processor 612 is arranged to implement the commands stored at the storage device of the MS 600 or stored at other storable processors 612. By implementing the stored commands or operating according to the hard coding, the processor 612 controls the operation of the MS 600 through instructing the MS 600 and the function of the relating management service internet options. The processor 612 can also be arranged to operate between the different modules of the MS 600, such as an MMI 650, a display apparatus 652, an RF module 620, and SIM cards 10, 20, 30 and 40. The RF module 620 receives the RF wireless signal from the antenna 630 and transforms the received RF wireless signal into a baseband signal implemented by the baseband chip 610. The baseband chip 610 receives the wireless signal and transforms the received baseband signal into the RF wireless signal transmitted by the antenna 630. The RF module 620 comprises a plurality of hardware components to implement the switching of wireless frequencies. For example, the RF module 620 comprises a frequency mixer multiplying the baseband signal and the carrier frequency of the wireless communication system. The carrier frequency of the wireless communication system can be 900 MHz, 1800 MHz, or 1900 MHz of the GSM system, or UMTS and the 900 MHz, 1900 MHz, or 2100 MHz of the WCDMA system, or other carrier frequencies dependent on the working RAT. As shown in FIG. 6, The SIM cards 10, 20, 30 and 40 are inserted into the four sockets of the MS 600. The MS 600 comprises a multi-card controller 640 coupled between the baseband chip 610 and the SIM cards 10, 20, 30 and 40. The multi-card controller 640 provides the different voltage levels for the SIM cards 10, 20, 30 and 40 according to the power management integrated chip (PMIC) and the different needs of the batteries. The voltage level used for each SIM card is determined in the initial stage. The baseband chip 610 reads data from the SIM cards 10, 20, 30 and 40 through the multi-card controller 640, and writes the data to one of the SIM cards 10, 20, 30 and 40. In addition, the multi-card controller 640 transmits the clock (CLK) to the SIM cards 10, 20, 30 and 40, resets (RST) the SIM cards 10, 20, 30 and 40, and/or inputs/outputs data information to the SIM cards 10, 20, 30 and 40. The baseband chip 610 can support one or several wireless access technologies such as GSM/GPRS/EDGE, UMTS, WCDMA, CDMA 2000, WiMAX, TD-SCDMA, LTE and TD-LTE. The SIM cards 10, 20, 30 and 40 can be one of the SIM card, USIM card, RUSIM card or CSIM card. The types of the SIM cards correspond to the wireless communication technology supported by the baseband chip 610. If the SIM card is not necessary to used in a certain RAT technology such as WiFi or WiMAX, the MS 600 comprises a keyboard, a touch screen, a touch keyboard, a gaming joystick, a mouse and/or a scanner. Specifically, The MMI 650 comprises a display apparatus 652 which can be implemented by a flat panel screen, a touch screen or any kind of displaying apparatus. Therefore, the MS 600 can camp on the internet provided by the same or different internet provider, or provided by the internet provider corresponding to the inserted SIM cards 10, 20, 30 and 40. The MS 600 can also operate on different modes such as an idle mode, a connection mode, a cell Dedicated Channel (CELL_DCH) mode, a cell Forward access channel (CELL_FACH) mode, a CELL_PCH mode, and a URA_PCH mode of the UTRAN using the RF module 620 and the baseband chip 610.

Figure 7:
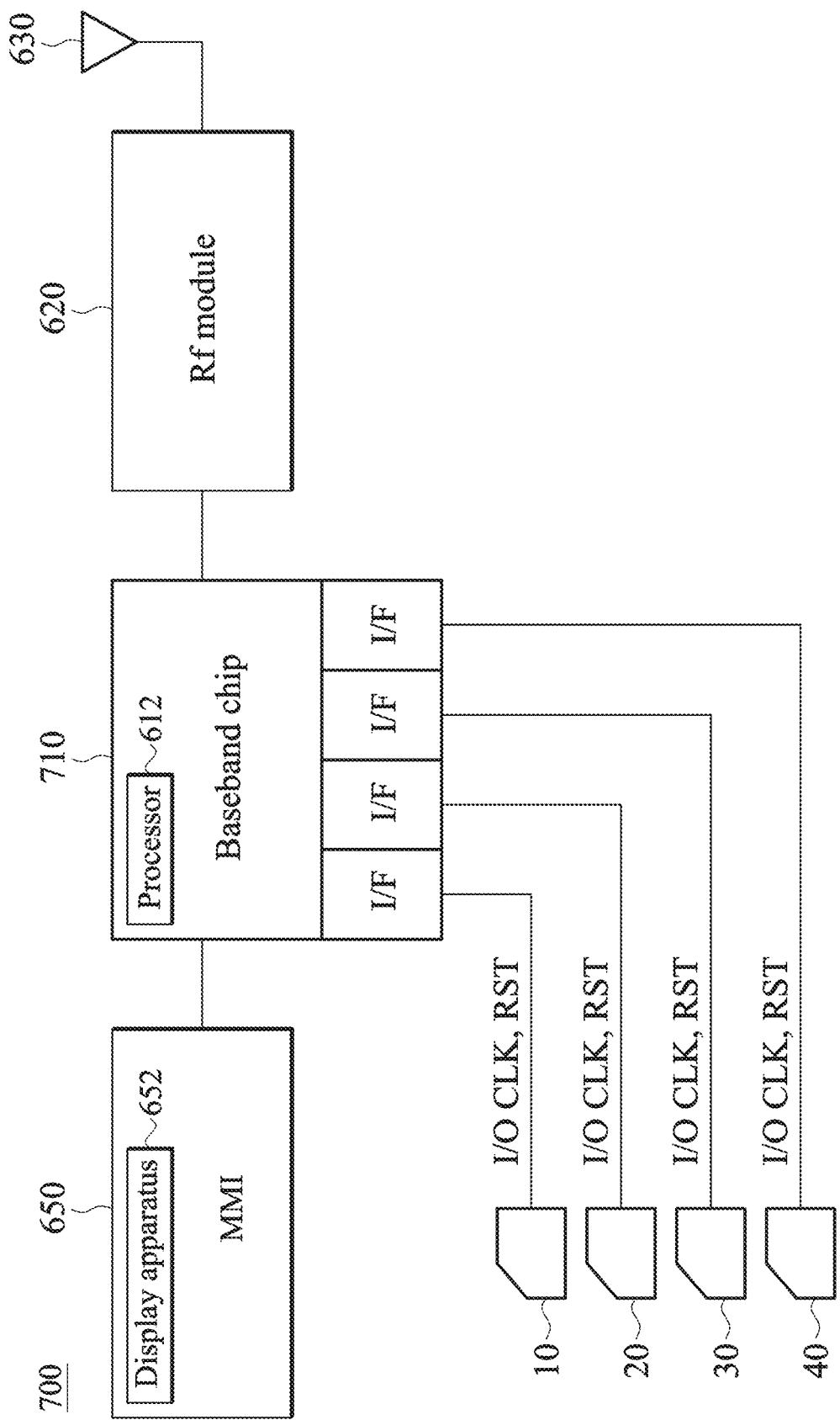
FIG. 7 is a diagram illustrating the hardware architecture of the MS 700 of the present intention.

In another embodiment, FIG. 7 is a diagram illustrating a hardware architecture of the MS 700 of the present intention. Similar to FIG. 6, the baseband chip 710 implements the procedure of the baseband signals including ADC/DAC, gain adjustment, modulating/demodulating, coding/decoding, and so on. The baseband chip 710 comprises a processor 712 controlling the operation of the MS 700 and the related operation of the accessed and inserted SIM cards. The MMI 650 comprises a display apparatus 652. Nevertheless, the connection between the MS 700 and the SIM cards 10, 20, 30 and 40 can be implemented only by four interfaces (I/F) provided by the baseband chip 710. Similarly, for the interference of the RAT which actually does not need a SIM card (such as the technology of WiFi or WiMAX), the MS 700 can provide options for the subscribers, request the subscriber to input the user name and the password through the MMI 650, or connect to the dongle needed by the MS 700. It can be understood that the hardware components shown in FIG. 6 or FIG. 7 can include less than four SIM cards by amendments, such as two or three SIM cards, but the invention is not limited thereto.

Figure 8:
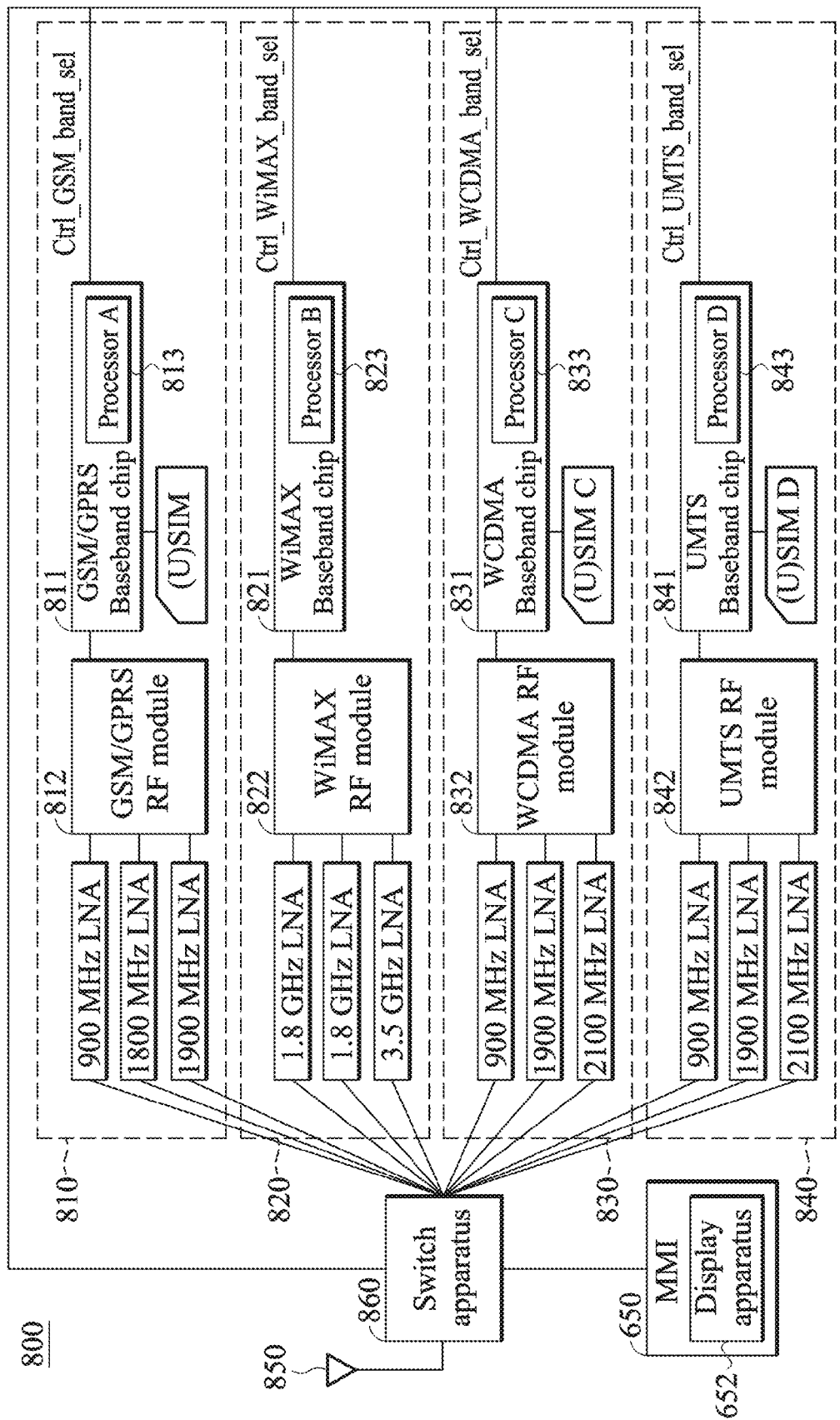
FIG. 8 is a diagram illustrating the hardware architecture of the MS coupling four SIM cards according to an embodiment of the present intention.

FIG. 8 is a diagram illustrating a hardware architecture of the MS 800 coupling four SIM cards according to an embodiment of the present intention. The illustrated hardware architecture is applicable for the MS of the technology of GSM/GPRS/EDGE, WCDMA, CDMA 2000, UMTS, TD-SCDMA, WiFi, WiMAX, LTE, LTE-A or TD-LTE. On the hardware diagram, the four RAT modules including the GSM/GPRS module 810, the WiMAX module 820, the WCDMA module 830 and the UMTS module 840 can share a single antenna 850. Each RAT module includes at least an RF module and a baseband chip to camp on a cell operating on a standby mode, an idle mode, a connection mode, a CELL_DCH mode, a CELL_FACH mode, a CELL_PCH mode or a URA_PCH mode. As shown in FIG. 8, the GSM/GPRS baseband chip 811 couples to the GSM/GPRS baseband RF module 812, the WiMAX baseband chip 821 couples to the WiMAX RF module 822, the WCDMA baseband chip 831 couples to the WCDMAN RF module 832, and the UMTS baseband chip 841 couples to the UMTS RF module 842. Each baseband chip comprises a processor, for example, the GSM/GPRS baseband chip 811 comprises the processor A 813, the WiMAX baseband chip 821 includes the processor A 823, the WCDMA baseband chip 831 comprises the processor A 833, and the UMTS baseband chip 841 comprises the processor A 843. In addition, when operating on a specific mode, each RAT module executes an interaction with the SIM card, such as (U)SIM cards A, B, C or D (It is noted that the SIM card is not needed when utilizing the internet of WiMAX or WiFi). The switch apparatus 860 is coupled between the antenna 850, the MMI 650 and a plurality of low noise amplifiers. The switch apparatus 860 connects the antenna 850 to an LNA to permit the RF signal to pass through the connected LNA. The switch apparatus 860 can also be used as a multiplexer to permit the display apparatus 652 to implement the display function according to the control signals of the processor 813, 823 or 833. Each LNA amplifies the signals of the 2G/3G/4G frequency band received by the shared antenna 850. The 2G/3G/4G frequency band can be the frequency band of 900 MHz, 1800 MHz, 1900 MHz, 2100 MHz or others. Once the baseband chip 811/821/831/841 tries to implement an operation of receiving or transmitting, such as an activity of transmission (TX) or receiving (RX), then the baseband chip 811/821/831/841 sends a control signal of Ctrl_GSM_band_sel, Ctrl_WiMAX_band_sel, Ctrl_UMTS_band_sel or Ctrl_WCDMA_band_sel to instruct the switch apparatus 860 to connect the antenna 850 to the assigned LNA. Similarly, each processor 813/823/833/843 can send a control signal of Ctrl_GSM_band_sel, Ctrl_WiMAX_band_sel, Ctrl_UMTS_band_sel or Ctrl_WCDMA_band_sel to control the operation of the service internet options. It can be understood that the GSM/GPRS module 810, the WiMAX module 820, the WCDMA module 830 and the UMTS module 840 are just for illustrating. For the people skilled in the art, the RAT module can be implemented by GSM/GPRS/EDGE, WCDMA, CDMA 2000, UMTS, TD-SCDMA, WiFi, WiMAX, LTE, LTE-A, TD-LTE or other technologies. While the invention has been described by way of example and in terms of the preferred embodiments, it is to be understood that the amendments of the hardware components of FIG. 8 and the more or less amount of the SIM cards are within the scope of the present invention.

The identification symbol of the SIM card is used to represent the SIM card actually inserted to the MS. Each identification symbol of the SIM card includes a name, a color, a status of a SIM card, and the four front-end numbers or the four back-end numbers of a SIM card, dependent on the preference of the subscriber. In another embodiment, if an actual RAT does not need a SIM card (such as the technology of WiFi or WiMAX), the identification symbol of the SIM card can also be used to indicate these service internets after the MS has connected to the corresponding service internet, but the present invention is not limited thereto. The subscriber can change the name and color of the SIM card and edit the number of the SIM card at the SIM function setting table. The SIM card can be obtained for corresponding to the service provider, or the setting can be changed for the preference of the subscriber. The MS can also assign different colors for the different SIM cards, and change the status including the standard, un-initiation, invalidity, activity, searching, roaming or others.

When several wireless communication modules and a single tranceiver are equipped in a multi-card mobile phone, each communication module is not aware of its responsible mission. For example, two or several communication modules operate respectively, but there is no proper communicating mechanism between the communication modules. For example, a multi-card mobile phone is allocated to set up an MO calling, and the multi-card mobile phone always utilizes a GSM wireless communication module to perform a predetermined service internet. When the previous described subscriber starts the application of a dial pad or sets up an MO call from the telephone book, the subscriber can decide to utilize the CDMA wireless communication module and another non-predetermined service internet to set up the MO call. In order to turn the MO call from the original service internet to the use of the selected wireless communication module and turn to the selected service internet, the single baseband chip of the multi-card mobile phone is in charge of providing the MMI interface for the subscriber and examining the selection signal transmitted by the subscriber. Therefore, the hardware of the RF resource for the request of the MO call becomes available, and performs the procedure of the MO call with a selected service internet. Or one processor of the multi-card mobile phone is in charge of providing the MMI interface for the subscriber and examining the selection signal transmitted by the subscriber.

Recommend the MMI Options According to the Amount of the Inserted SIM

Multi-card mobile phones can meet the needs of using a plurality of user identification cards, however, so far the design of multi-card mobile phones are not friendly. Traditionally, whether the mobile phone equipped with several sockets has several cards, and the options of the SIM cards are designed according to the maximum capability of the inserted cards and are displayed on the interface of the mobile phone. The socket not inserted by a SIM card can be displayed by a gray color for indicating that the card has not been initiated. According to research and investigation, the need for the amount of the SIM cards for different users or the same user at different periods varies more extensively. Therefore, such fixed design brings information confusions and inconvenience for the use of the subscriber, and sometimes it increases the complexity of selection and viewing.

Figure 9:
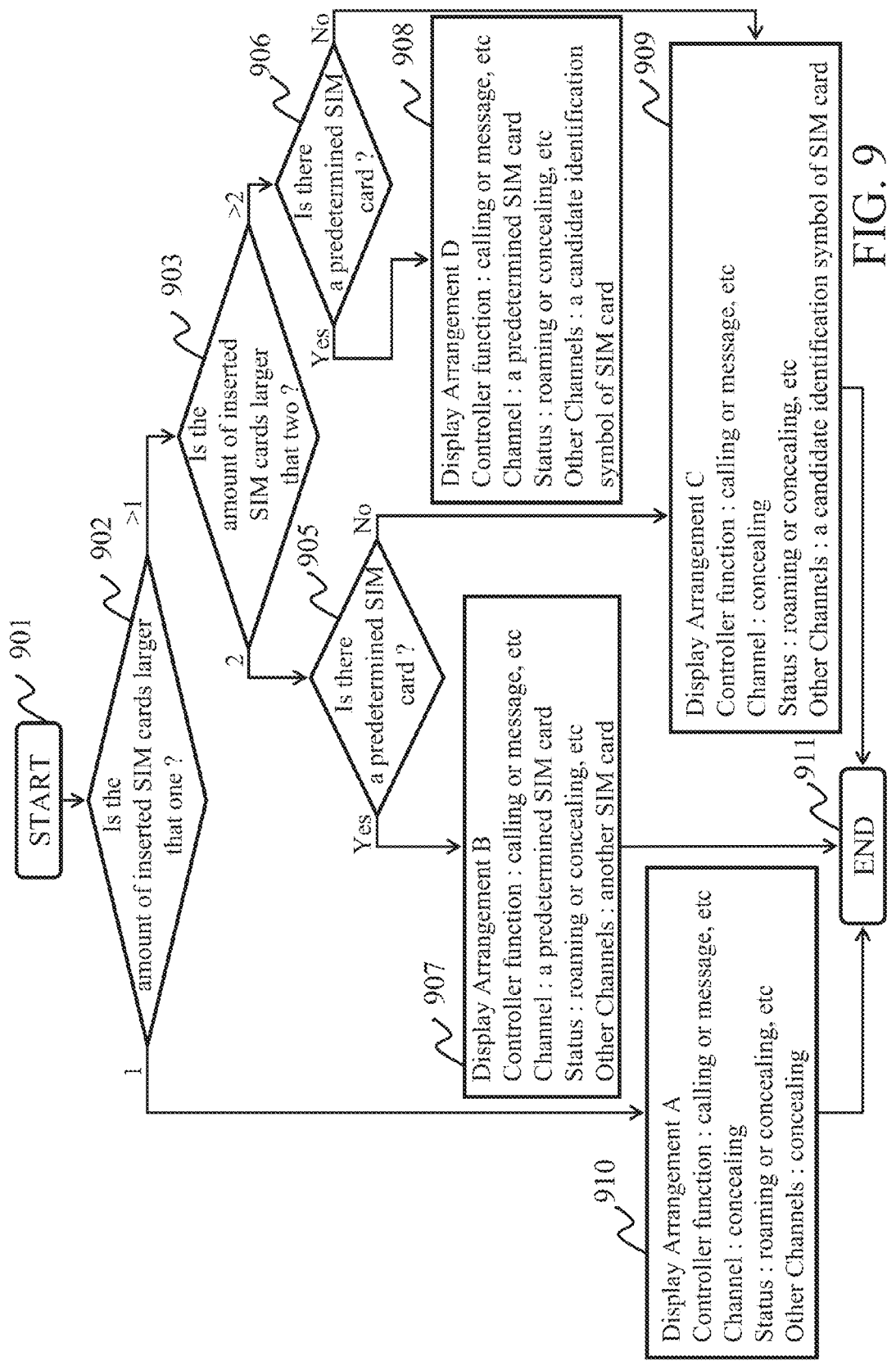
FIG. 9 is a flow chart illustrating a procedure of a method of providing different MMI menus for a subscriber based on the amount of the inserted SIM cards according to an embodiment of the present invention.

FIG. 9 is a flow chart illustrating the procedure of the method of providing different MMI menus for the subscriber based on the amount of the inserted SIM cards according to an embodiment of the present invention. Although the embodiment takes the SIM cards as an example for illustrating, it can be understood that the SIM card can also be a USIM card or R-USIM card, and the present invention is not limited thereto. After the MS has been initiated or the amount of the inserted SIM cards has been changed (the step 901, start), the examiner of the MS (such as the processor in the baseband chip of the MS 600 in FIG. 6 and the MS 700 on the FIG. 7, or a separate processor, but the present invention is not limited thereto) examines the amount of the inserted SIM cards, and determines whether the amount is larger than one (step 902). If the amount of the inserted SIM cards equals to one, an application controller is generated through the MMI to display the display arrangement A for the subscriber (step 910), which means that only one SIM card option is displayed on the application controller of the mobile phone. It can also be the same with the traditional single card mobile phone to conceal (without displaying) the options of other SIM cards. The amount of the inserted SIM cards can be examined and the operation of other components can be controlled by the processor of the multi-card controller of the MS, the single baseband chip, or the baseband chip, or by a separate and single processor. In addition, the operation of the MMI can be controlled by the processor of the baseband chip, such as generating and displaying the MMI on the display device, however, the present invention is not limited thereto.

If the amount of the inserted SIM cards equals to two (step 903), the processor further examines whether there is a predetermined SIM card (step 905). In an embodiment, the predetermined SIM card can be determined based on a scenario or a number. If the amount of the inserted SIM cards equals to two and there is a predetermined SIM card, the processor of the MS 110 is arranged to display a display arrangement B, i.e., an application controller is generated to show that a certain channel is a predetermined SIM card. At the same time, at the application controller, another SIM card of another channel is displayed as a candidate project for the subscriber to select if needed. On the contrary, if the amount of the inserted SIM cards equals to two and there is no predetermined SIM card, the processor of the MS 110 is arranged to generate the application controller to display a display arrangement C (step 909). For example, there is no option of the predetermined SIM card at the application controller, but other available SIM cards are displayed at the back end of the application controller by an icon for providing the subscriber a further option when using the scenario. Other available SIM cards can be displayed as a candidate identification symbol.

If the amount of the inserted SIM cards is larger than two (step 906), for example, the amount equals to three, whether there is a predetermined SIM card is further determined If the predetermined SIM card exists, the application controller is generated to display the project display D (step 908), which is different with the options of other channels at the back end of the application controller. For example, the candidate identification symbol can be changed to the icon for the subscriber to select a SIM card, such as an overlapping icon of the amount of other available SIM cards to inform the subscriber about the amount of available SIM cards to be selected, or a number can be directly displayed to inform the subscriber that the processor has detected the MS 110 inserted by n SIM cards. If there is no SIM card, the display arrangement C is displayed with the same method of the MS 110 inserted with two SIM cards.

The different corresponding operating relationships between the display of the application controller and the amount of the inserted SIM cards detected by the MS are further explained as follows.

Figure 10:
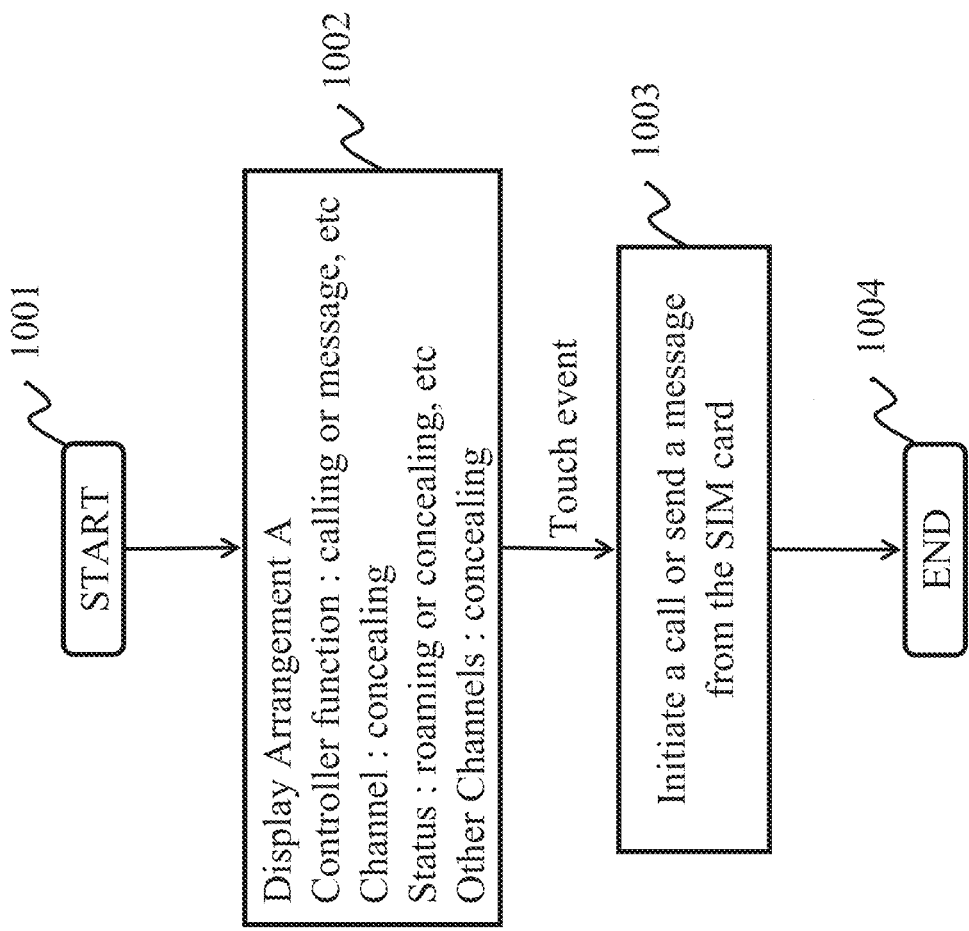
FIG. 10 is a flow chart illustrating an operation procedure when a processor of the MS detects an inserted SIM card according to an embodiment of the present invention.

FIG. 10 is a flow chart illustrating the operation procedure when the processor of the MS detects an inserted SIM card according to an embodiment of the present invention. On the application controller (such as calling), a display arrangement A is displayed to provide available options for the subscriber by concealing the icon of the SIM cards or displaying the detected identification symbol of the SIM card. Specifically, after detecting the subscriber selecting an application, the processor of the MS loads a controller relating to an application (such as calling) on the interface of the mobile phone, and conceals the icon of the SIM card or displays the identification symbol of the detected SIM card at the same time. If a SIM card (SIM 1) is inserted (step 1001, start), the display arrangement A is displayed (step 1002), and the icon of the SIM card at the calling application controller is concealed or the identification symbol of the detected SIM 1 is displayed. At the same time, whether there is a selection signal corresponding to the calling application controller or the identification symbol of the SIM 1 is detected. If the selection signal is detected by the processor, the connection is set up utilizing the SIM and the corresponding service internet through the multi-card switch controller as an example, and according to the procedure of implementing a call application as shown in FIG. 2, a call is initiated from the SIM card or information is transmitted at step 1003. It should be understood by those skilled in the art that the selection signal of the corresponding calling application controller or the identification symbol of the SIM card can be a touching signal on the touch screen, or the signals of hardware keyboards or navigating selections, but the present invention is not limited thereto.

Figure 11A:
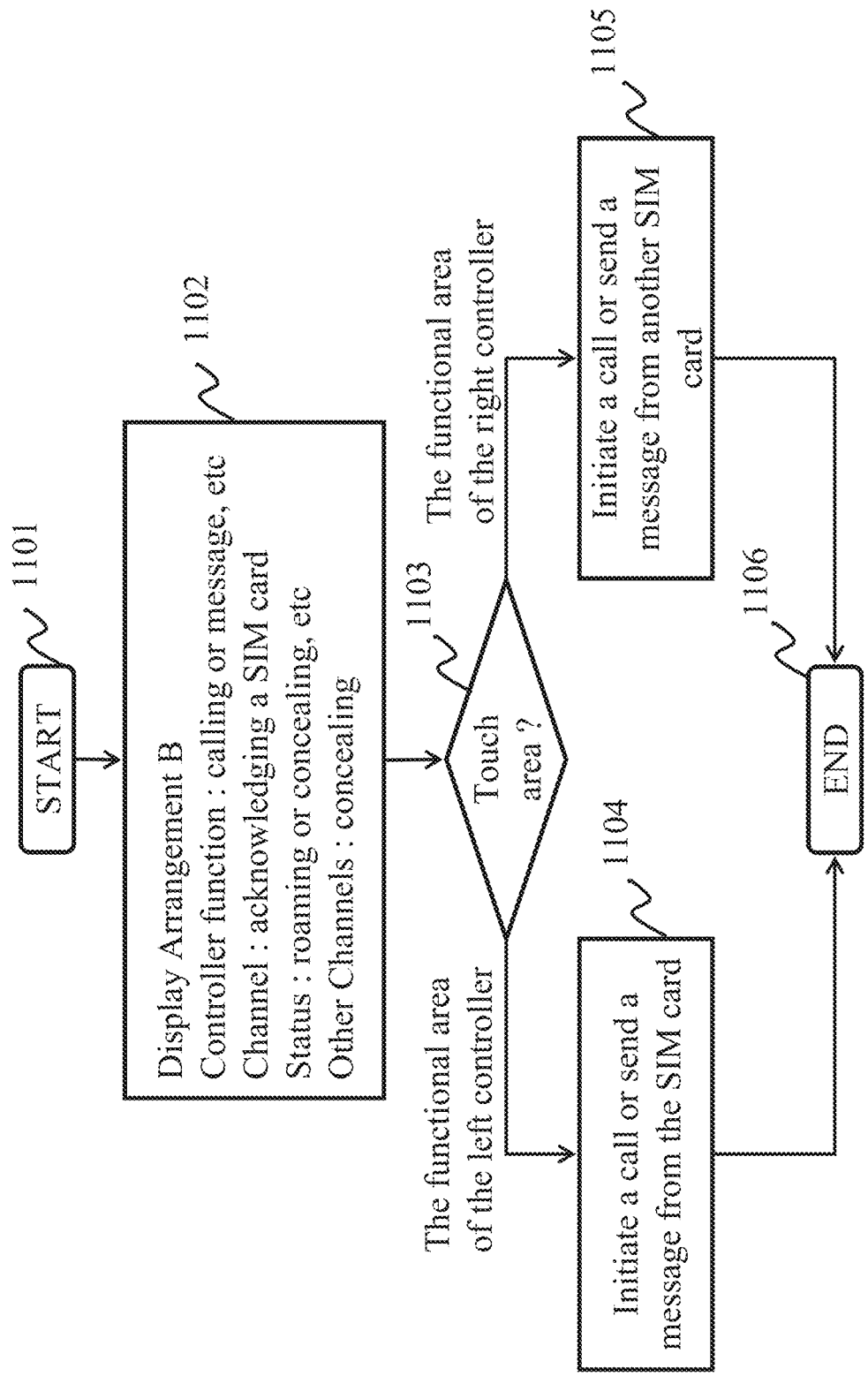
FIG. 11a is a flow chart illustrating an operation procedure when the processor of the MS detects two inserted SIM cards according to an embodiment of the present invention.
Figure 11B:
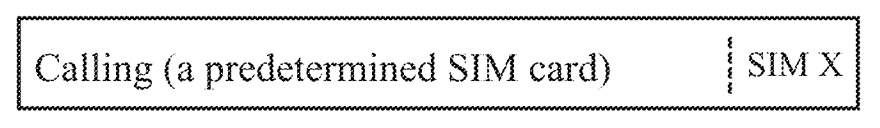

FIG. 11a is a flow chart illustrating an operation procedure when the processor of the MS detects two inserted SIM cards according to an embodiment of the present invention, and FIG. 11b is a diagram of the application controller. On the display arrangement B with two inserted and detected SIM cards (step 1101) and a predetermined card, if the application controller (such as calling) can partially display the predetermined SIM card at the front end of the application controller, the reserving identification symbol can be displayed at the back end of the calling application controller to display other SIM options for selection. Specifically, if the amount of the inserted SIM cards equals to two (such as SIM 1 and SIM 2), the processor of the MS displays the display arrangement B and loads a controller of a related application (such as calling) at the interface of the mobile phone, after detecting that an application has been selected by the subscriber and a predetermined card exists. At the same time, the identification symbol of the predetermined SIM card (such as SIM 1) and the candidate SIM card (such as SIM 2) are displayed, and whether there is a selection signal on the identification symbol of the SIM 1 is detected. If the processor detects a selection signal (step 1103, detecting whether there is a selection signal on the touching area), the connection is set up by the SIM 1 and the corresponding service internet (step 1103, the touching area detects the options of the functional area of the left space), and the calling application (step 1104) is executed according to the procedure shown in FIG. 2. If the selection signal on the option of the candidate SIM card (i.e., SIM 2) is detected (step 1103, the touching area selects the other channel areas of the right side), the connection is set up by the SIM 2 and the corresponding service internet, and the active calling application is implemented according to the procedure shown in FIG. 2.

Figure 12A:
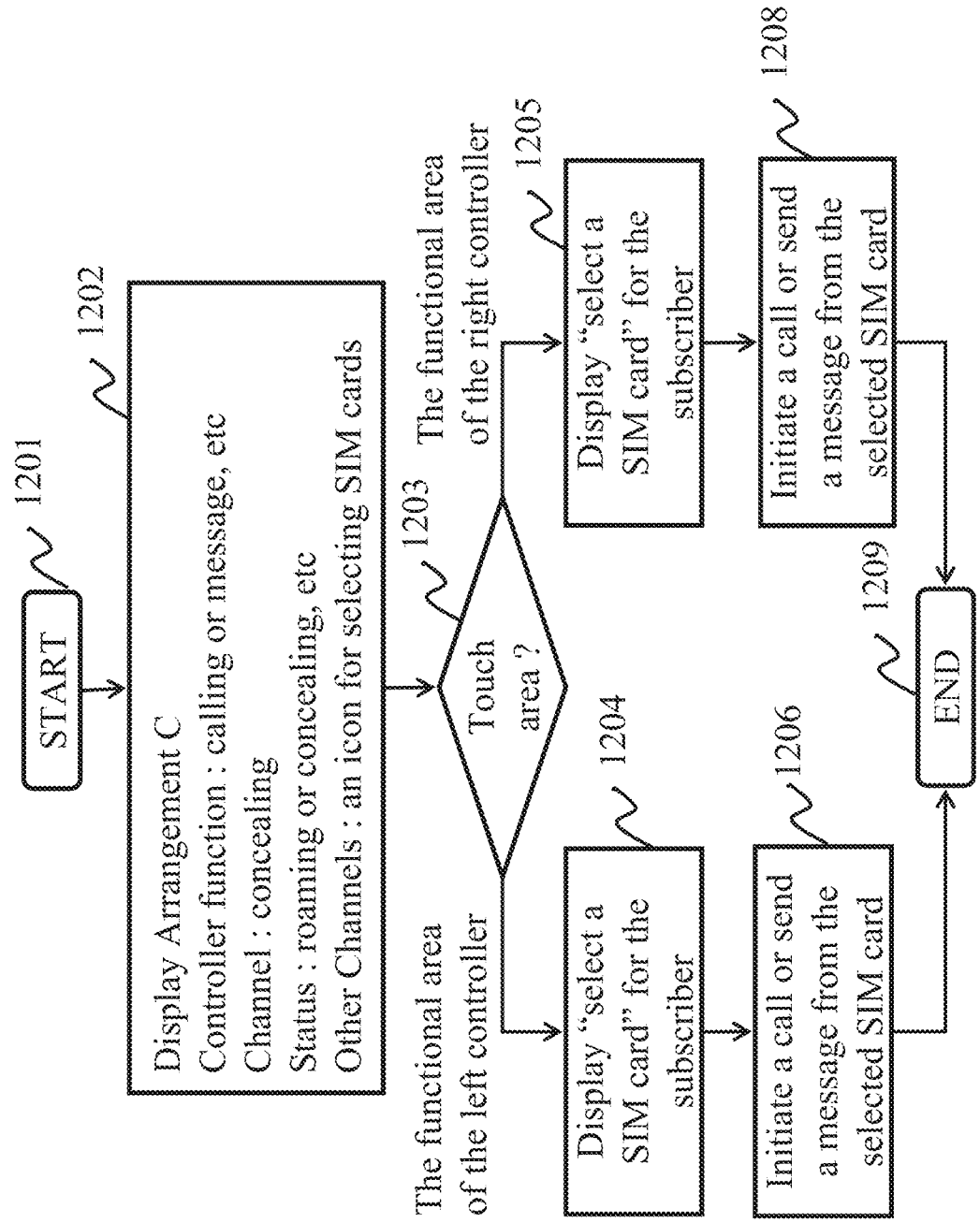
FIG. 12a is a diagram illustrating an operation procedure when the processor of the MS detects two and more than two inserted SIM cards according to an embodiment of the present invention.
Figure 12B:
FIG. 12b is a diagram of the application controller.

FIG. 12a is a diagram illustrating an operation procedure when the processor of the MS detects two and more than two inserted SIM cards according to an embodiment of the present invention, and FIG. 12b is a diagram of the application controller. When the MS is inserted with two and more than two SIM cards, if there is no predetermined SIM card, the display arrangement C is displayed (step 1202). The function of the controller is displayed at the left region of the application controller (such as calling) of the MMI, and other channel regions are displayed at the right region. Because now there is no predetermined SIM card, the option of displaying "selecting a SIM card" is needed no matter whether the subscriber touches the controller function region on the left side or other channel regions on the right side. Therefore, the subscriber can select one SIM card from several available SIM cards and utilize the selected SIM card to start a call or transmit information. Specifically, if the amount of the inserted SIM cards is equal or larger than two and no predetermined SIM card is detected, the processor of the MS will display the display arrangement C after detecting that an application has been selected by the subscriber. At first, the controller of a related application (such as calling) is loaded on the interface of the mobile phone, and the identification symbol of the candidate SIM card is displayed at the same time. It should be noted that because the amount of the candidate SIM cards is larger than one, the identification symbol of the candidate SIM card can be represented by a number or an intuitional method of overlapping papers. When the selection signal of the identification symbol of the candidate SIM card selected by the subscriber is detected, the processor of the MS displays the available options of the SIM cards for the subscriber by displaying a SIM menu or SIM icons, and waits for further signals selected by the subscriber. If the subscriber selects a certain SIM card, after the corresponding selection signal is detected by the MS, the communication connection between the corresponding selected SIM card and the corresponding service internet will be set up. For simplicity, the similar steps in FIG. 12a will not be described.

Figure 13A:
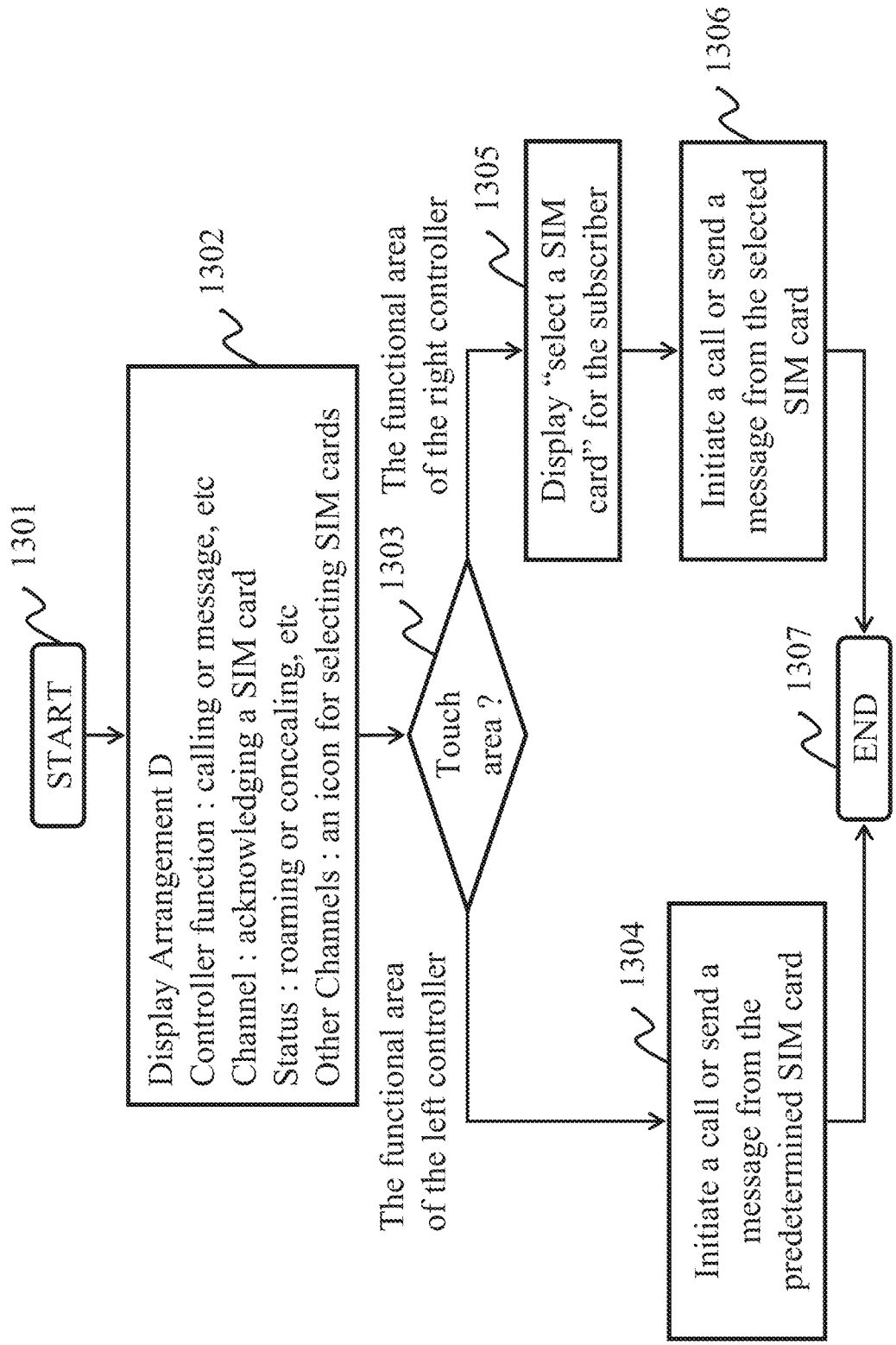
FIG. 13a is a diagram illustrating an operation procedure when the processor of the MS detects three and more than three inserted SIM cards without a predetermined card according to an embodiment of the present invention.
Figure 13B:
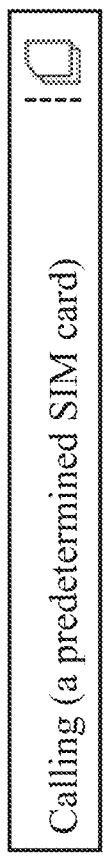
FIG. 13b is a diagram of the application controller.

FIG. 13a is a diagram illustrating an operation procedure when the processor of the MS detects three and more than three inserted SIM cards without a predetermined card according to an embodiment of the present invention, and FIG. 13b is a diagram of the application controller. When the MS is inserted with more than two SIM cards, if there is a predetermined SIM card, the display arrangement D is displayed. The functions of the controller and the predetermined SIM are displayed on the left region of the application controller (such as calling) of the MMI, and the other channel regions are displayed on the right region. Because there is a predetermined SIM card, the predetermined SIM card is utilized to set up a call or transmit information, if the subscriber touches the left controlling function regions of the application controller. If the subscriber chooses to touch the other channel regions of the right side of the application controller, the options of "selecting a SIM card" is displayed on the MMI for allowing the subscriber to select one of the several available SIM cards, thereby utilizing the selected SIM card to start a call or transmit information. The detailed description of the display arrangement D will no longer proceed. It can be understood by those skilled in the art that similar parts of the display arrangement D can be taken reference to the display arrangement B and C. For simplicity, the similar steps of FIG. 13a will not be described again.

The above embodiments correspond to a certain application (scenario) and provide the subscribers the design projects of the MMI for inserting different SIM cards. However, for those skilled in the art, the correspondence to the amount of the inserted SIM cards can also be implemented by signals of the status row, detailed information of the contacts, and reminding center (information of the service provider) as an example. FIG. 14a to FIG. 14e are the diagrams of the other settings based on the amount of the inserted SIM cards according to the embodiment of the present invention.

Figure 14A:
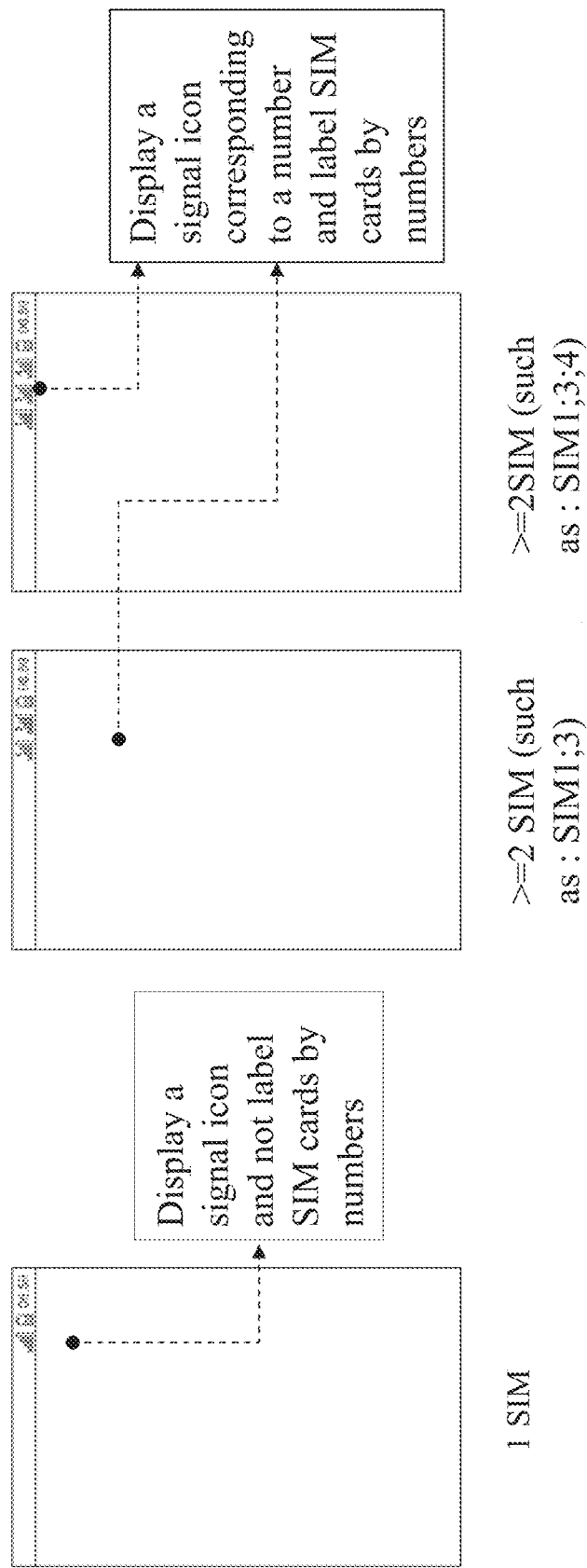
FIGS. 14a to 14f are diagrams illustrating other settings according to an amount of the inserted SIM cards according to an embodiment of the present invention.

As shown in FIG. 14a, in the signals of the status row, the corresponding status signal of the inserted SIM card is displayed according to the amount of the inserted SIM cards. The corresponding status signal of the SIM card not inserted is concealed. In addition, the signal icon corresponding to the status row of the inserted SIM card can be represented by the styles of different digitals or colors for the subscriber to identify the corresponding SIM card. The style corresponding to the signal icon can be assigned by the subscriber or the system.

Figure 14B:
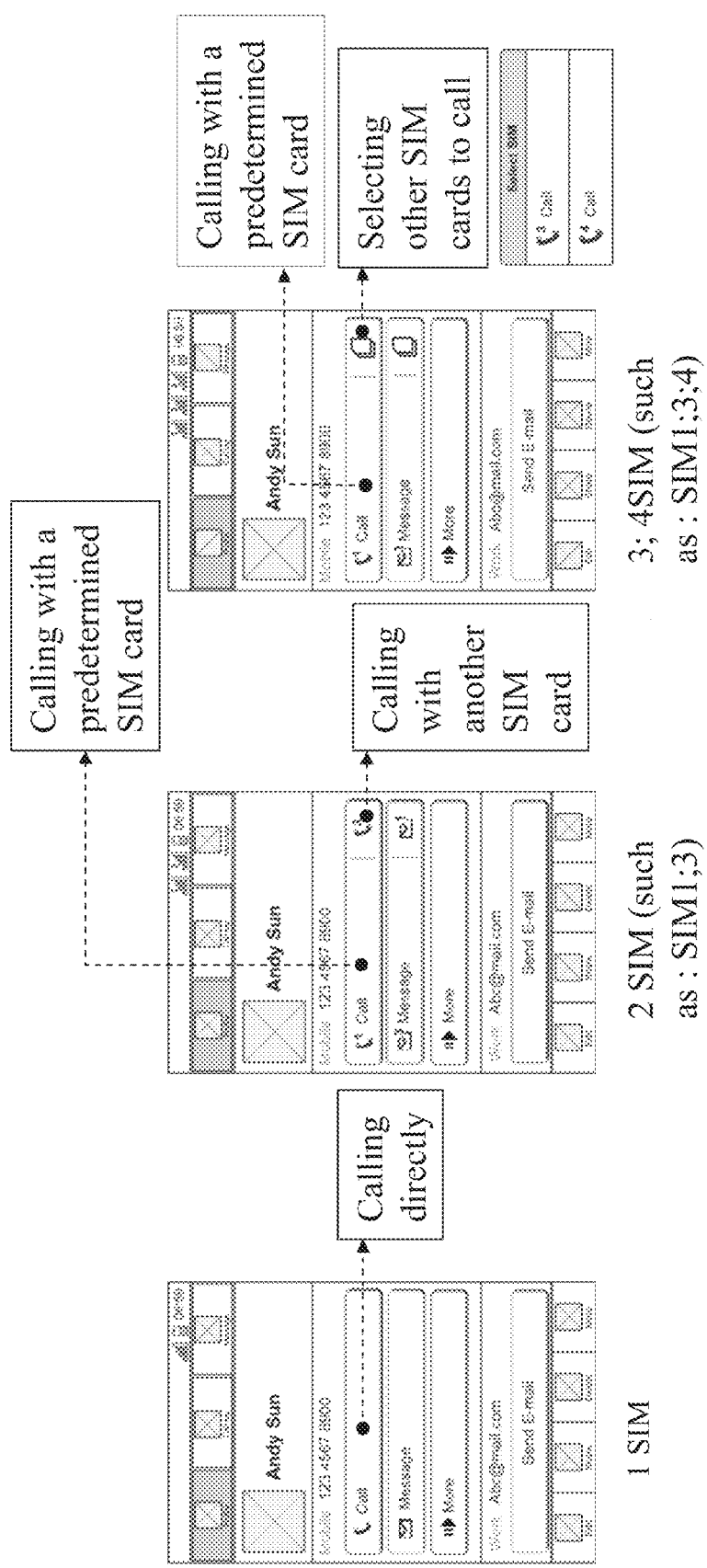

As shown in FIG. 14b, for the detailed information of the contacts, if the MS detects that a certain contact has been selected by the subscriber, the options of the available applications about the contact can be displayed on the MMI. Furthermore, the previously described embodiments can be applied to provide different indicating signal symbols such as a predetermined car or a candidate card for the application options in the detailed information of the contacts. According to the amount of the candidate cards, when the selection signal of the subscriber at the icon of the candidate card has been selected by the MS, the MS develops an optional menu or icon of the candidate cards to provide further options for the subscriber.

Figure 14C:
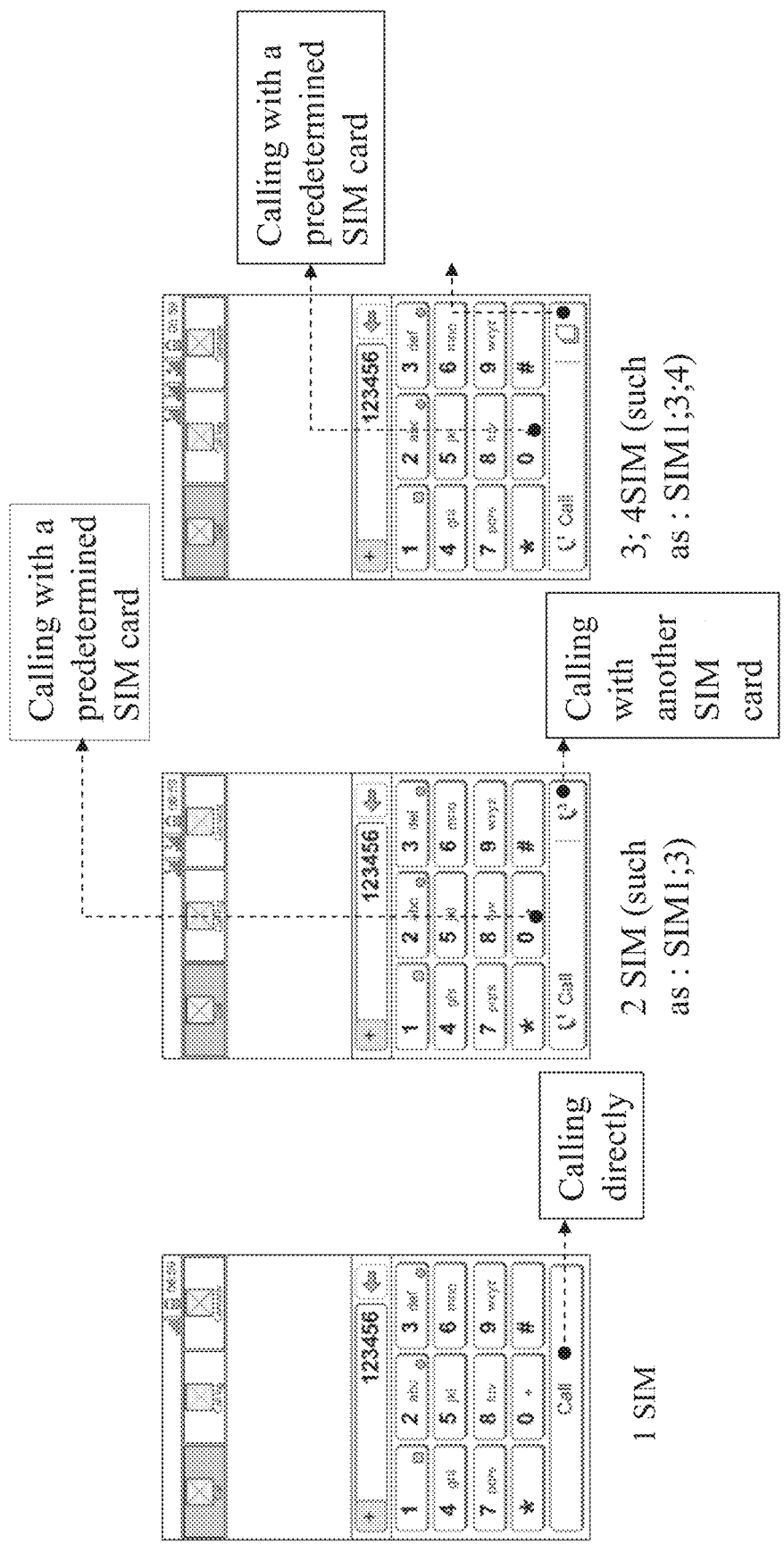

As shown in FIG. 14c, the embodiments described above are also suitable for the application of calling by the numbers inputted by the dial pad. Specifically, if there is a predetermined SIM card, the indicating icon of the predetermined SIM card is provided by the left side of the calling application controller for the subscriber to select. If the amount of the inserted SIM cards is larger than two, the options of the candidate card are displayed at the right side of the calling option for the subscriber to select and open the option menu or icon for further selections.

Figure 14D:
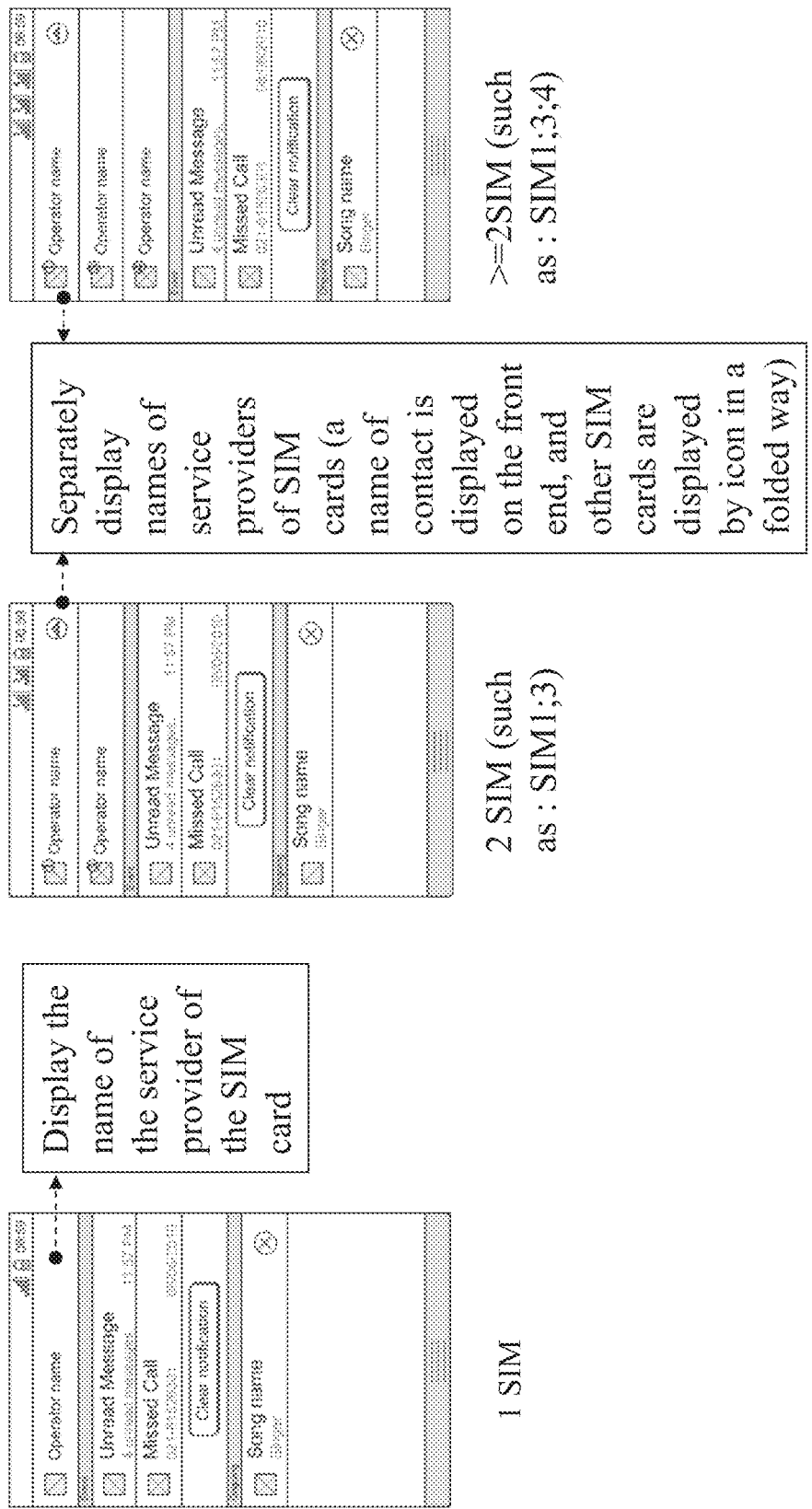

As shown in FIG. 14d, the same implementing method as the signals of the status row can also be applied for the name and icon of the service provider of the reminding center. In addition, the information of the service provider can be rowed in a folded way, and provide an option of "developing selection" for the subscriber to select.

Figure 14E:
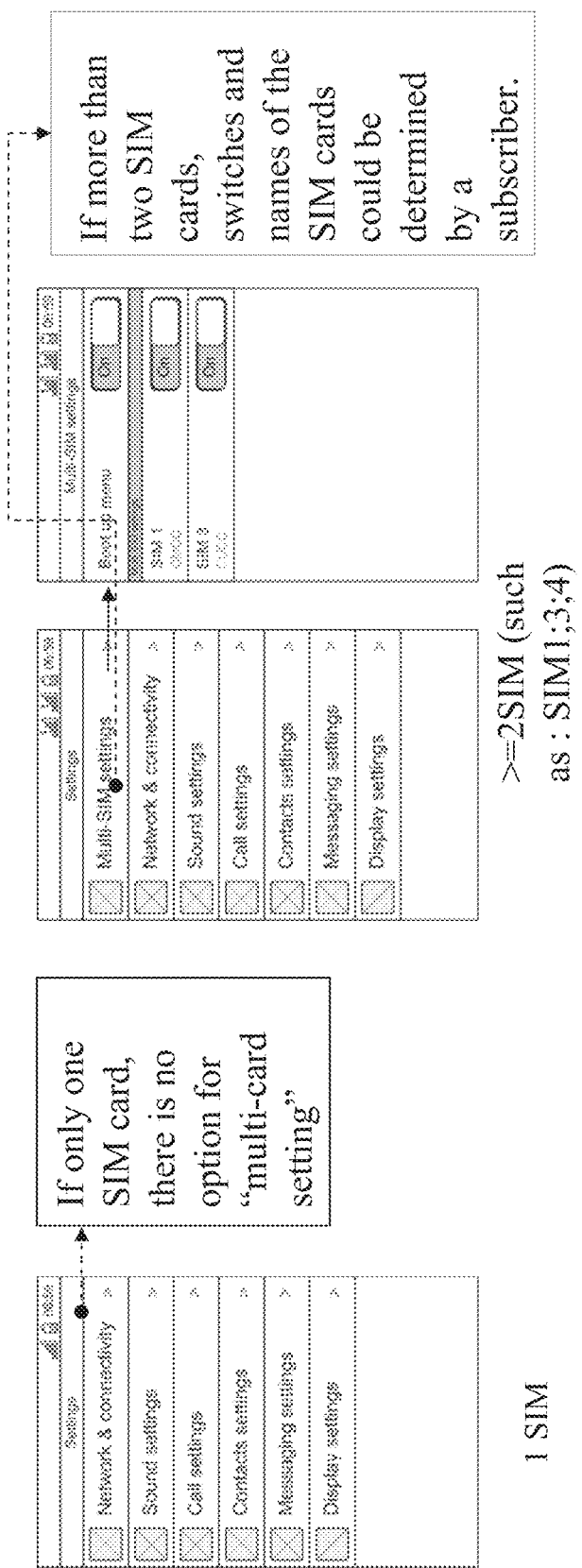
Figure 14F:
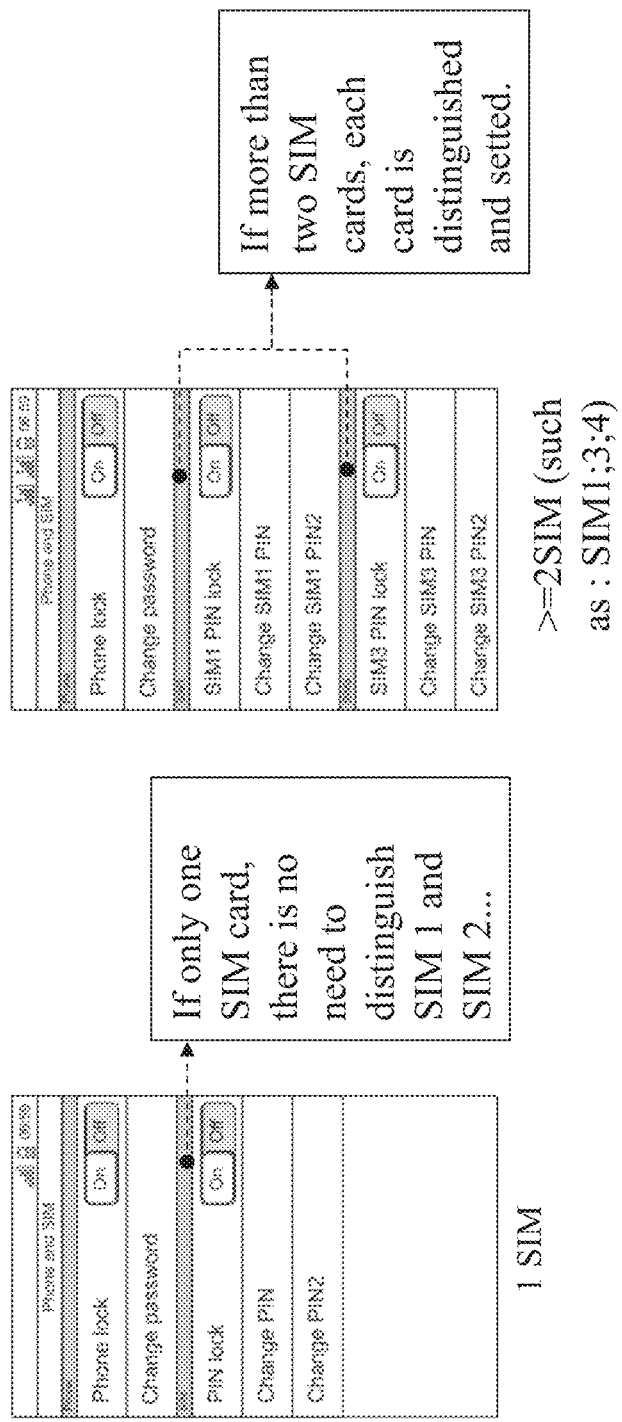

As shown in FIG. 14e to FIG. 14f, for the setting of the SIM, once the subscriber chooses to enter into the setting function of the SIM, the available SIM cards can be displayed by a folded way on the setting of the SIM. In addition, the option of "developing selection" can be provided for the subscriber to choose for developing and viewing and to wait for further setting operations. Or a plurality of settings are merged in a folded way for each SIM card, and the option of "developing selection" can be provided for the subscriber to choose to develop and to further proceed settings of each option (such as time, ring, and a setting of the short message) of each SIM.

The Selection of the Predetermined Cards.

In an embodiment of the present invention, because the storage apparatus of the mobile phone or the SIM card can record the communication records and the storing telephone book, the predetermined card can be recommended for the subscriber according to the communication records of the existing numbers. For example, the previously utilized SIM card can be a predetermined SIM card for use during a next time. This implementation method is called the selection of the predetermined cards which is "based on the numbers". However, if the subscriber inputs a new number to implement a communication request or the number which is not stored in the telephone book is inputted to implement a communication request, only depending on the telephone book and the communication records cannot provide a suitable predetermined card for the subscriber. In another embodiment, the previously utilized SIM card is not necessarily the best SIM card for the current application. For example, the previous operation is for a short message and the SIM 1 is selected to perform a communication connection. However, the next time the subscriber needs to implement a calling operation, the SIM 1 is not necessarily the best choice.

Figure 15:
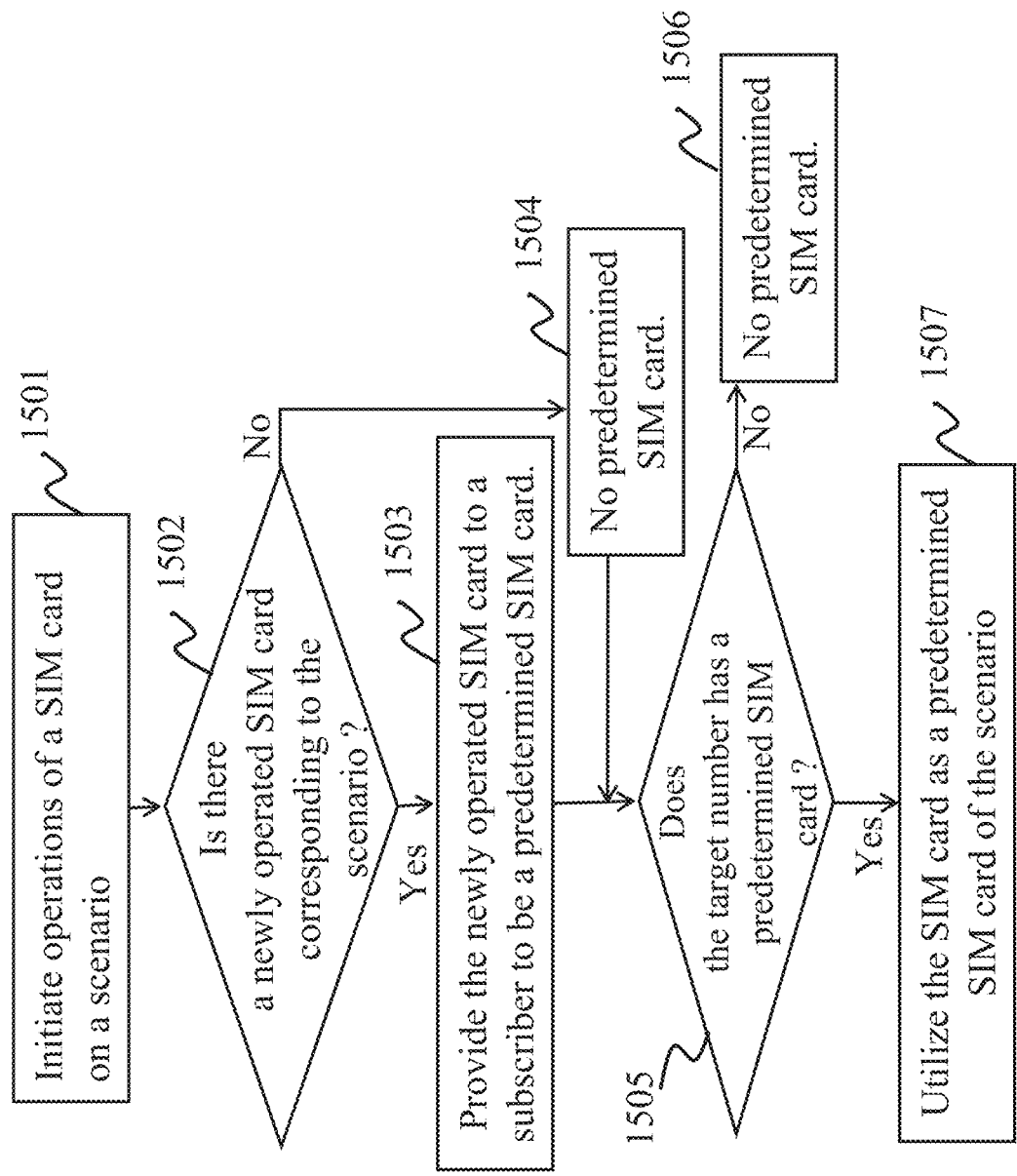
FIG. 15 is a flow chart of the method of providing a predetermined card for a subscriber based on an application (scenario) according to an embodiment of the present invention.

FIG. 15 is a diagram of a method of providing a predetermined card for the subscriber according to the application (scenario) in an embodiment of the present invention. At first, an apparatus equipped with multi-card communications, such as the processor of the baseband chip of the MS, can record the latest information of the SIM card of the same type operations implemented by the subscriber at the same application and position (scenario). The apparatus records the information at a storage apparatus (not shown on the figure) and is provided to the subscriber as the predetermined SIM card for use during a next time. For example, if there is a history of the calling application operation implemented by a number newly inputted by a subscriber, next time when the subscriber enters a new number or select the options of the telephone book to implement a call, the operation history of the previous and same-type application can be referred to the subscriber for recommending the predetermined card. The implementing method can be called a selection of the predetermined card which is "based on the scenario".

Take the MS for example, as shown in FIG. 15, the processor initiates at least one operation of the SIM card at first on an application (scenario) (step 1501). Take a calling application (scenario) for example, if the subscriber wants to initiate a call and selects a call function by the MMI of the mobile phone, such as selects the calling function table, the processor of the MS initiates the related operations of at least one inserted available SIM card and corresponds to the calling application. The application controller of the calling function and the options of the available SIM cards are displayed on the MMI of the MS. Then, for at least one of the initiated and inserted SIM card, the controller of the MS determines whether there is a newly operating SIM card suitable for this scenario from each SIM card (step 1502). For example, for the calling options, the MS stores the communication history of the SIM card recorded on the apparatus. The processor can determine whether there is a SIM card selected and utilized by the latest call according to the communication history. If yes, the newly operating SIM card can be provided to the subscriber as the predetermined SIM card which is "based on the scenario" (step 1503). If not, no predetermined SIM card is then determined (step 1504). If the determination is finished and there is a newly operating SIM card for the calling option, the processor of the MS further determines whether there is a predetermined SIM card "based on the number" for the number selected by the subscriber (step 1505). For example, for the target SIM card, when the input number appears in the number matching region and the subscriber selects the same number in the number matching region, and the number has the predetermined SIM card "based on the number", the predetermined SIM card "based on the number" is further utilized to be the number of initiating a call (step 1507). If the target number does not have the predetermined SIM card "based on the number", the further utilized predetermined SIM card "based on the scenario" is provided for the subscriber to be the predetermined SIM card of the scenario (step 1506).

It can be understood for those skilled in the art that if there are several service providers are at a region, maybe for the subscriber, the calling fee of a service provider is cheap, and the short text fee of another service provider is cheap. When the subscriber chooses to initiate a call or transmit a text, if there is no usually utilized SIM card (such as the SIM card with the lowest charging fee) of the target number about the SIM card latest utilizing the scenario to be recommended for the subscriber, it will be more convenient to not need to re-select a suitable SIM card for usage and operation of the subscriber.

Figure 16A:
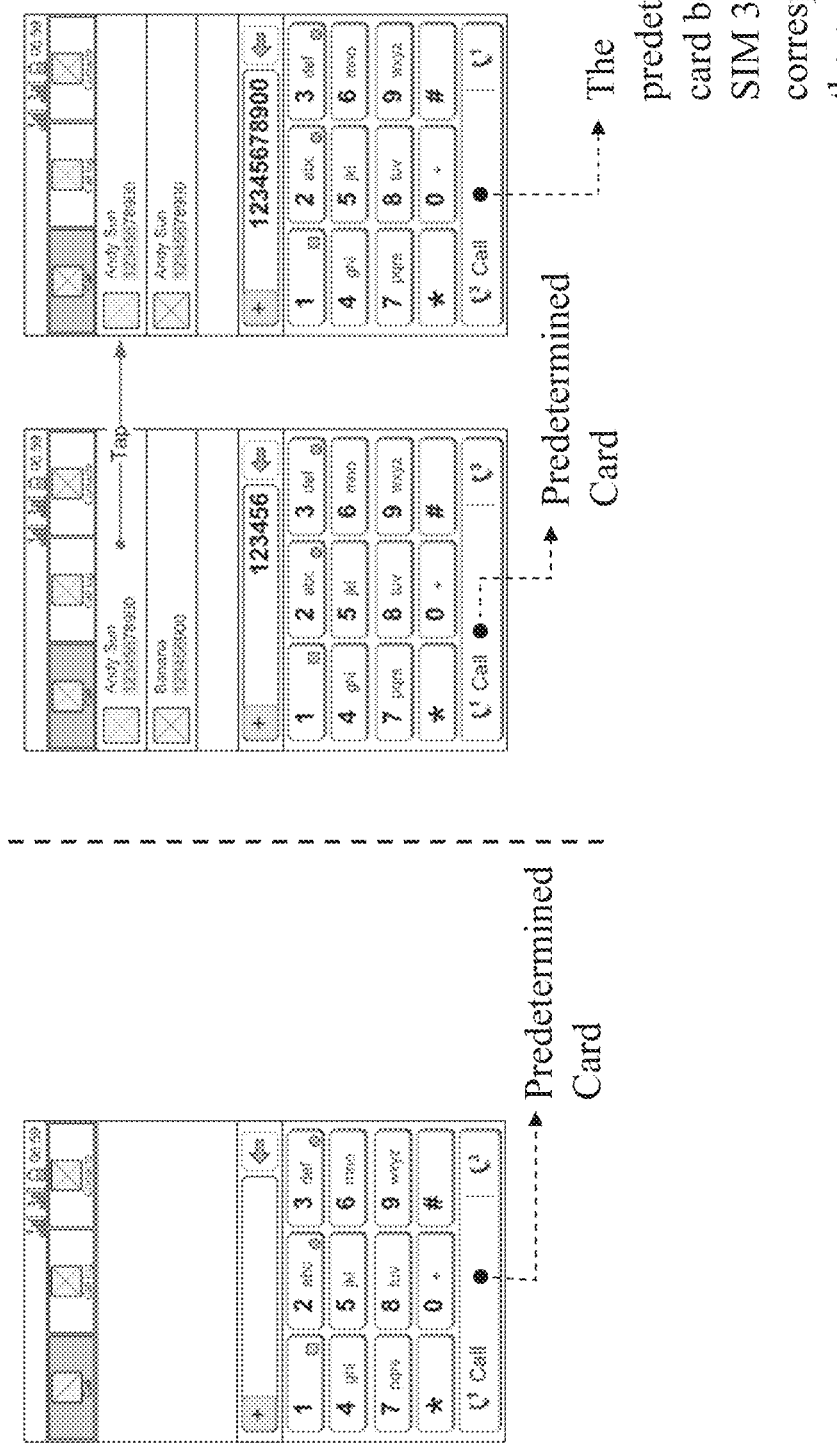
FIGS. 16a to 16b are diagrams of providing a predetermined SIM card on the MMI of the MS.
Figure 16B:
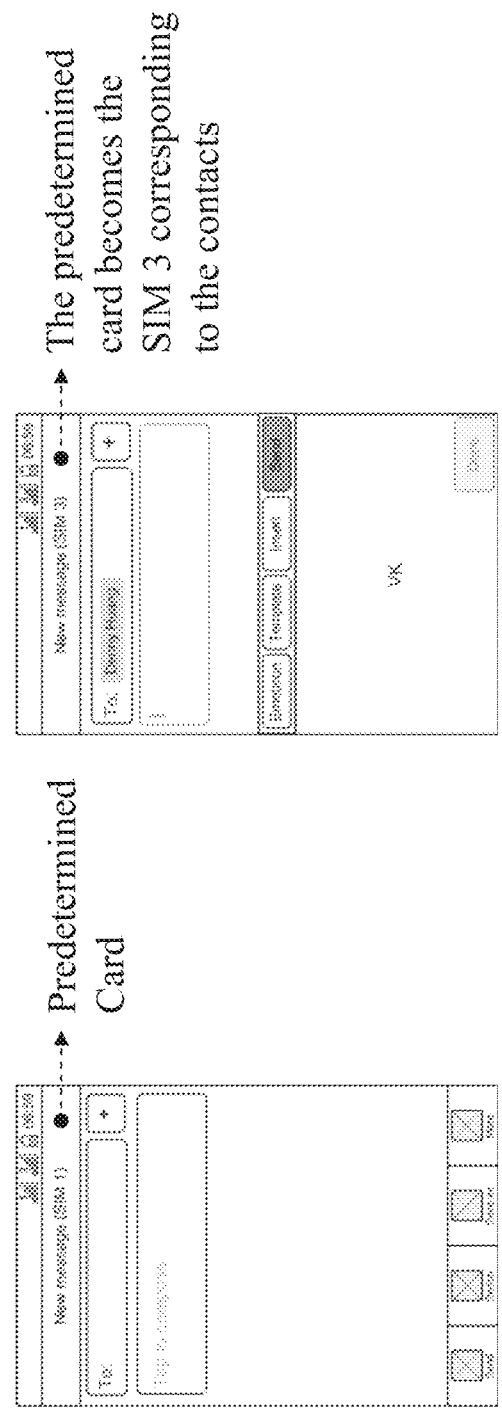

FIG. 16a to FIG. 16b are diagrams of providing a predetermined SIM card on the MMI of the MS. As shown in the left side of the FIG. 16a, if the SIM 1 is the latest SIM card utilizing a calling application (scenario), it will be labeled at the front end of the calling application controller. In addition, other SIM cards selected by the subscriber can be labeled at the back end of the calling application controller. Because the current MS is inserted with two SIM cards and the SIM 1 is the SIM card most recently utilized by the subscriber for dialing a call, when the subscriber enters into the image, the SIM 1 as a predetermined SIM card is displayed on the left side of the calling controller.

As shown on the right side of the FIG. 16a, if the SIM 1 is the SIM card of the same dialing position, when the subscriber inputs the number of the initiating call and the number has its own corresponding and predetermined SIM card (SIM 3), now the SIM 3 will appear at the left side of the calling controller with a higher priority. At the same time, it can be a predetermined SIM card recorded at the storage device for calling during a next time and be provided to the subscriber.

For the informational application (scenario), as shown on the left side of the FIG. 16b, the current mobile phone is inserted with two SIM cards (SIM 1 and SIM 3), and the SIM 1 is the most recent SIM card utilized by the subscriber to transmit information on a new message composer. Therefore, when the subscriber selects the image again, the SIM 1 is the predetermined card and appears on the title position. As shown on the right side of the FIG. 16b, the current mobile phone is inserted with two SIM cards (SIM 1 and SIM 3), and the card SIM 1 is the most recent SIM card utilized by the subscriber to transmit information on a new message composer. When the subscriber adds or inputs an existing number and the number has a corresponding SIM card (SIM 3), the SIM 3 will be the predetermined SIM card of the scenario and appear at the title position with a higher priority.

Although the embodiments of the present invention are illustrated by a calling and a message as an example, it can be understood by those skilled in the art that different applications (scenarios), such as browsing news, sending mails and downloading audio or video from the internet as long as belonging to the spirit of the present invention can utilize the method described above to recommend the SIM cards for the subscriber, and the present invention is not limited thereto. The scope of the present invention is intended to cover various modifications and similar arrangements (as would be apparent to those skilled in the art).

Table 1 illustrates the mapping relationships between the predetermined cards and the applications (scenarios) recorded in a table and stored at a storage device of the MS 110 according to an embodiment of the present invention.

| Serial Number | Name Of The Application/ Scenario | Predetermined SIM |
|---|---|---|
| 1 | Dial Pad | SIM 1 |
| 2 | New Message | SIM 2 |
| . . . | . . . | . . . |

If the applications (scenarios) are on the existing data structure, the column of the predetermined SIM card can be newly added to the existing data structure of the applications (scenarios). As shown in Table 2, the variable A and the variable B are the existing variables of the application name of the application program corresponding to the existing data structure.

| Name Of The Application/ Scenario | Variable A | Variable B | . . . |
|---|---|---|---|
| Dial Pad | 2 | 0 | . . . |
| . . . | . . . | . . . | . . . |

In addition, for the application which does not need a SIM card to set up a communication connection (such as WiFi), if the processor of the MS detects that the subscriber has initiated the application, the controller of the application can be displayed on the MMI at first. Then, according to the option previously utilized by the application (such as the dongle), the option can be displayed on a part of the application controller as a predetermined option (such as the front end). Then, the candidate options can be displayed at the back end of the application controller (such as the options of the subscriber name and the password). When the selection signal corresponding to the predetermined options of the front end is detected, the MS sets up the communication connection by the method of utilizing the predetermined option, and vice versa.

The Design of the Application Controller

On the display interface of the traditional multi-card mobile phones, regardless of the amount of the inserted SIM cards, the options related to the SIM cards are displayed on the MMI in the list form. The subscriber encounters a problem of selecting the SIM cards when the options related to the SIM cards are implemented. The functions of the controller in the interface of the mobile phone in the current technology are more unitary, and the relationship (such as the priority) between several SIM cards is unclear, such that the correlation of each other is not good.

One embodiment of the present invention provides a setting of the application controller on the MMI, such that there is a correlation between the SIM cards and the application options displayed on the MMI. In addition, the subscriber can be informed about the own function of the application (scenario) and be provided by the predetermined SIM cards and the options of the candidate SIM cards on the application (scenario).

Figure 17:
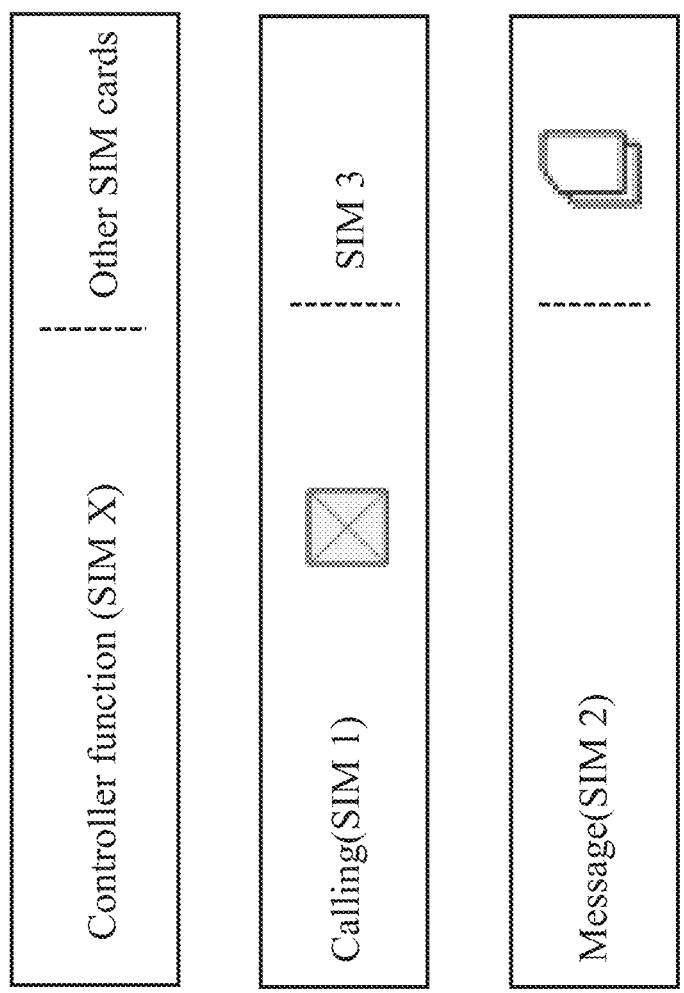
FIG. 17 is a diagram illustrating a display arrangement of an application controller according to an embodiment of the present invention.

FIG. 17 shows application controllers according to the embodiment of the present invention. Each of the application controllers on the MMI is separated by the left region and right region to respectively display the situation of the functions of the current available application controllers and the situation of the other available channels. It can be understood by those skilled in the art that other display arrangements distinguishing the relationship between the function of the application controller and several selectable channels are all within the scope of the present invention. Several selectable channels (such as several available SIM cards) can also be further divided into the predetermined SIM cards and other candidate SIM cards.

Referring to FIG. 17, FIG. 17 illustrates a display arrangement of the application controller according to an embodiment of the present invention. In order to distinguish the relationship between the function of the application controller and several selectable channels, the whole application controller is at first divided into two parts. Information (such as picture plus text) for informing the subscriber about the main function of the controller and including the predetermined SIM card recommended for the application function can be displayed in one part of the application controller. Furthermore, the display arrangements (such as the roaming status and the name of the service provider of the SIM card) can be provided in a form of MMI displaying for the predetermined SIM card to inform the subscriber. The other part of the application controller is arranged to provide other available channels for the subscriber, such as other available candidate SIM. Referring to FIG. 17, on the first application controller, the first part is a calling controller function or the predetermined SIM card (SIM 1), i.e., other status information, and the second part is the candidate SIM card (SIM 3). On the second application controller of FIG. 17, the first part is the message function and the predetermined SIM card (SIM 2), and the second part is the labels of the candidate SIM cards. The labels of the candidate SIM cards are labeled as two overlapping options to indicate that there are two candidate SIM cards. Or the labels of the candidate SIM cards can be labeled as the amount of the SIM cards, such as two or three.

Figure 18A:
FIG. 18a to FIG. 18b are diagrams illustrating the different options of the application controllers according to the predetermined SIM cards and the number of the inserted SIM cards.
Figure 18A:
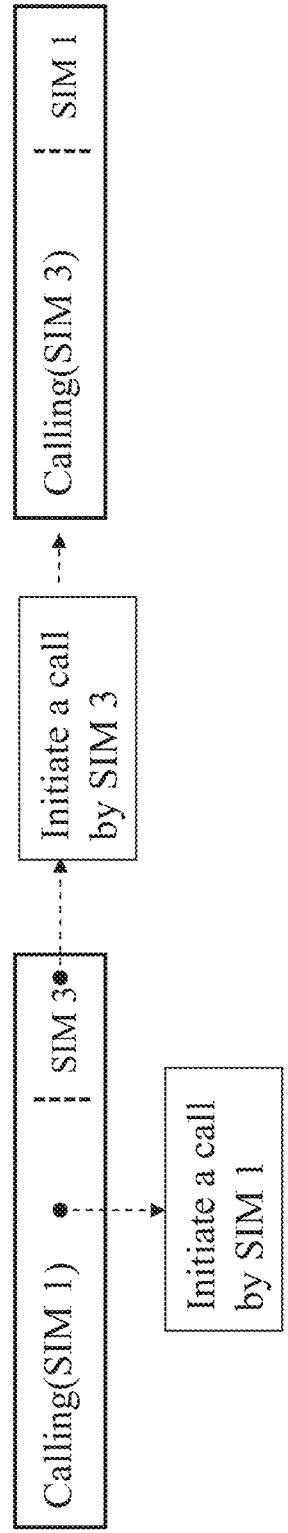
Figure 18A:
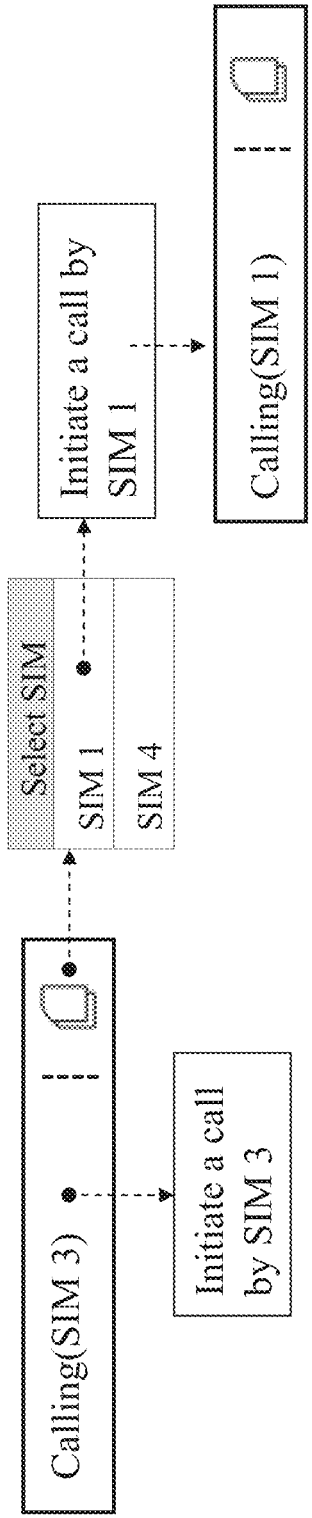
Figure 18B:
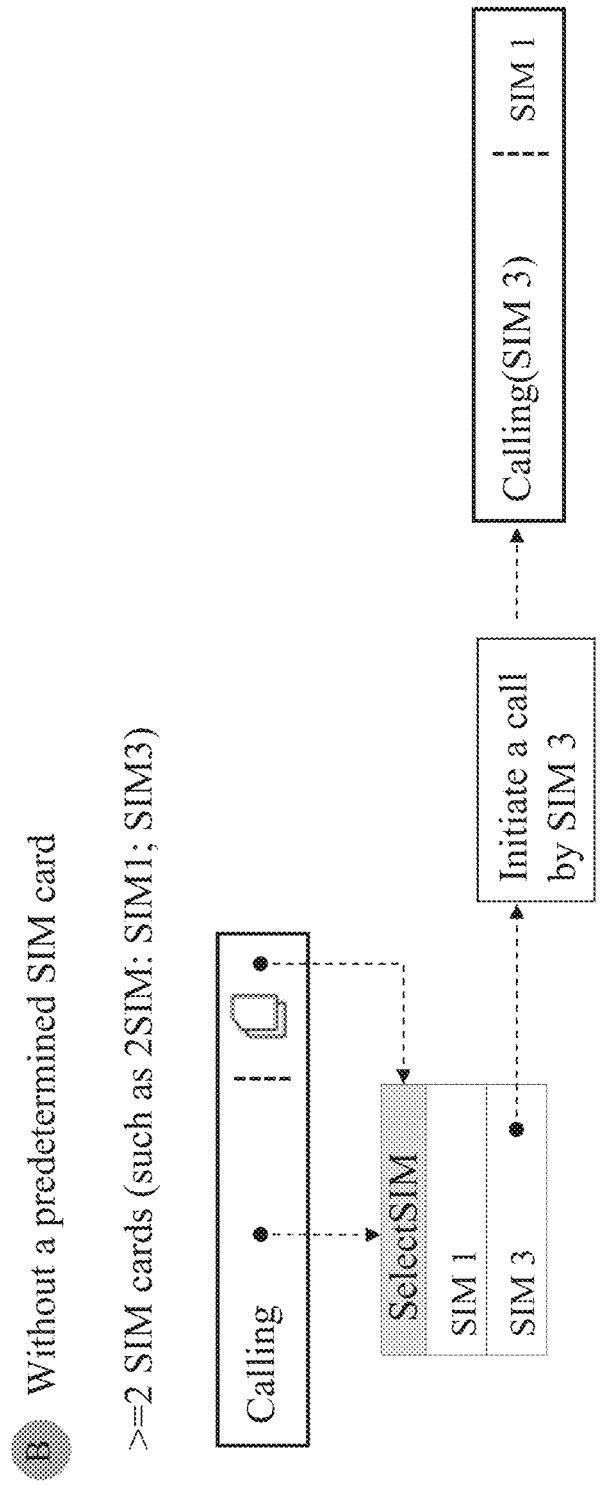

FIG. 18a to FIG. 18b illustrate different operations of the application controllers according to the predetermined SIM cards and the number of the inserted SIM cards.

Under the situation of having a predetermined SIM card, for example, the MS detects two inserted SIM cards and the processor determines that the SIM 1 is the predetermined SIM card. If the application option selected by the subscriber is a calling, the application controller is displayed as a calling controller by the processor through the MMI. If the selection signal of the subscriber is detected by the first part of the application controller, the processor of the MS utilizes the SIM 1 to initiate a call and set up a communication connection. If the selection signal of the subscriber is detected by the second part of the application controller, the candidate SIM card (i.e., SIM 3) is utilized to initiate a call.

If the amount of the detected available SIM cards is larger than two, the difference with the case where the amount of the available SIM cards equals to two is that the second part of the application controller displayed on the MMI can be an icon to indicate another available channel (i.e., a selected icon of another candidate SIM card). If the processor detects the selection signal of the subscriber, a selection list of the SIM card is further displayed by the MS on the MMI. If the selection signal of the subscriber is detected on the selection list, the communication connection is then implemented by the selected SIM card.

For the situation of not having a predetermined SIM, no matter whether the selection signal of the subscriber is detected by the first part or the second part of the application controller, the selection list of the SIM card is displayed on the MMI for the selection of the subscriber.

In another embodiment, under the situation that a SIM card is not needed to implement the communication connection (such as connecting the internet of WiFi or WiMax), a dongle icon or a reminder text can be provided by the first part of the application controller. The name of the subscriber and/or the password or a reminder text can be provided by the second part of the application controller, and vice versa.

Figure 19:
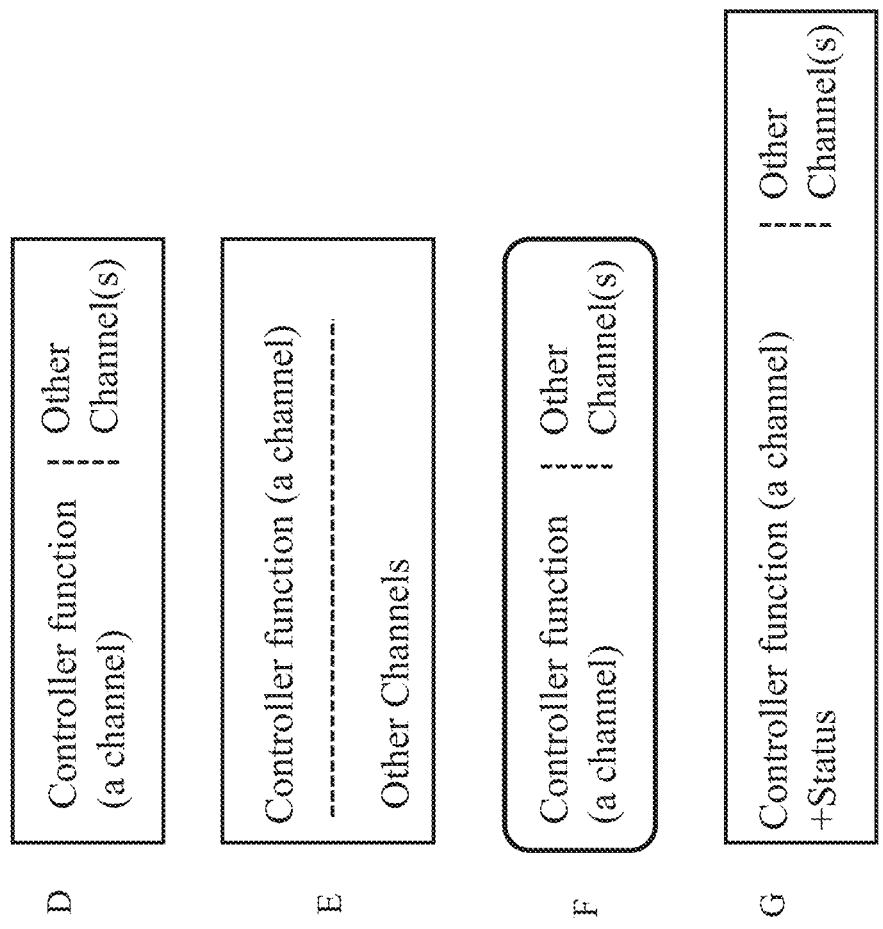
FIG. 19 is a diagram illustrating other display arrangements of application controllers according to an embodiment of the present invention.

FIG. 19 illustrates other display arrangements of the application controller according to an embodiment of the present invention. As shown in FIG. 19, the display arrangements are displayed by the left/right arrangements or up/down arrangements, or functionally displayed by the current status of the predetermined SIM on the controller such as whether roaming or not for the subscriber to see other information of the predetermined SIM card more clearly.

The status relationship between several channels can be implemented more strongly as a whole by dividing the application controller into two parts and respectively displaying the options of a particular channel and other candidate channel, or further displaying the status of a particular channel such as roaming The selection is stronger and is not easily forgotten by the subscriber. In addition, for the setting of the MMI, it is more user-friendly and saves more monitor space to display more options for the subscriber. It is particularly important for taking the touch screen as the end apparatus. In addition, it is also within the scope of the present invention to divide the displaying of the function of the application controller and the available channels into an up part and a down part. It can be understood by those skilled in the art that it is intended to cover various modifications and similar arrangements in agreement with the spirit of the present invention. The scope of the invention is best determined by reference to the appended claims.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication apparatus, equipped with at least one subscriber identification module (SIM) cards, the communication apparatus comprising:
   a detector, arranged to detect an amount of the SIM card(s) inserted on the communication apparatus;
   a processor, providing different man-machine interfaces (MMIs) according to the number of the inserted SIM card(s);
   wherein when the number of the inserted SIM card(s) equals to one, the processor provides a single card MMI for a subscriber without displaying an option for SIM card(s) not inserted on the single card MMI;
   when the number of the inserted SIM card(s) equals to two, the processor provides a double card MMI for the subscriber; and
   when the number of the inserted SIM card(s) is larger than two, the processor provides a multi-card MMI for the subscriber, wherein the single card MMI, the double card MMI and the multi-card MMI are displayed on a display apparatus,
   wherein the display apparatus displays the different double card MMIs and the different multi-card MMIs based on a predetermined SIM card.

2. The communication apparatus as claimed in claim 1, wherein the single card MMI, the double card MMI and the multi-card MMI all comprise an application controller.

3. The communication apparatus as claimed in claim 2, wherein when the number of the inserted SIM card(s) is larger than two and a communication request corresponding to an application is initiated by the subscriber, the processor detects whether the communication request has a predetermined SIM card.

4. The communication apparatus as claimed in claim 3, wherein on the double card MMI or the multi-card MMI, when the communication request with the predetermined SIM card is initiated by the subscriber, the processor respectively displays the predetermined SIM card and a candidate identification symbol on the application controller; or when the communication request without the predetermined SIM card is initiated by the subscriber, the processor displays the candidate identification symbol on the application controller.

5. The communication apparatus as claimed in claim 4, wherein the application controller comprises a first part and a second part, and the second part comprises the candidate identification symbol and the first part comprises an icon of the predetermined SIM card.

6. The communication apparatus as claimed in claim 5, wherein the first part of the application controller comprises a functional icon corresponding to the communication request, and when the processor detects that the subscriber has selected the functional icon,
   if the processor has detected the predetermined SIM card exists and a non-predetermined SIM card is not selected by the subscriber, the communication apparatus executes an operation corresponding to the functional icon by the predetermined SIM card;
   if the processor has detected the predetermined SIM card exists and the non-candidate identification symbol has been selected by the subscriber, the processor of the communication apparatus sends an indication signal to indicate the subscriber that a non-predetermined SIM card is selected; and
   if the processor has detected the predetermined SIM card does not exist and the candidate identification symbol has been selected by the subscriber, the communication apparatus executes the operation corresponding to the functional icon by the non-predetermined SIM card.

7. The communication apparatus as claimed in claim 6, wherein on the application controller of the multi-card MMI, the non-predetermined SIM card is represented by the candidate identification symbol, and when the communication apparatus detects that the candidate identification symbol has been selected by the subscriber, at least one part of the non-predetermined SIM card is displayed for selection of the subscriber.

8. The communication apparatus as claimed in claim 3, wherein the communication request comprises at least one of a calling communication request, a text communication request, or a data transmitting communication request and a SIM card setting.

9. An man-machine interface (MMI) display method, executed by a communication apparatus equipped with at least one subscriber identification module (SIM) cards, the MMI display method comprising:
   detecting, by processor circuitry in the communication apparatus, a number of SIM card(s) inserted on the communication apparatus;
   providing different MMIs according to the amount number of inserted SIM card(s);
   wherein when the number of the inserted SIM card(s) equals to one, the processor provides a single card MMI for a subscriber without displaying an option for SIM card(s) not inserted on the single card MMI;
   when the number of the inserted SIM card(s) equals to two, the processor provides a double card MMI for the subscriber: and
   when the number of the inserted SIM card(s) is larger than two, the processor provides a multi-card MMI for the subscriber, wherein the single card MMI, the double card MMI and the multi-card MMI are displayed on a display apparatus,
   wherein the display apparatus displays the different double card MMIs and the different multi-card MMIs based on a predetermined SIM card.

10. The MMI display method as claimed in claim 9,
    wherein the single card MMI, the double cards MMI and the multi-card MMI all comprise an application controller.

11. The MMI display method as claimed in claim 10, wherein when the number of the inserted SIM card(s) is larger than two and a communication request corresponding to an application is initiated by the subscriber, the MMI display method further comprises:
    detecting whether the communication request has a predetermined SIM card.

12. The MMI display method as claimed in claim 11, wherein on the double card MMI or the multi-card MMI, when the communication request with the predetermined SIM card is initiated by the subscriber, the processor respectively displays the predetermined SIM card and a candidate identification symbol on the application controller, or when the communication request without the predetermined SIM card is initiated by the subscriber, the processor displays the candidate identification symbol on the application controller.

13. The MMI display method as claimed in claim 12, wherein the first part of the application controller comprises a functional icon corresponding to the communication request, and when the processor detects that the subscriber has selected the functional icon:
- if the processor has detected the predetermined SIM card exists and the candidate identification symbol has been selected by the subscriber, the communication apparatus executes an operation corresponding to the functional icon by the predetermined SIM card;
- if the processor has detected the predetermined SIM card exists and the non-candidate identification symbol has been selected by the subscriber, the processor of the communication apparatus sends an indication signal to indicate the subscriber that a non-predetermined SIM card is selected; and
- if the processor has detected the predetermined SIM card does not exist and the candidate identification symbol has been selected by the subscriber, the communication apparatus executes the operation corresponding to the functional icon by the non-predetermined SIM card.

14. The MMI display method as claimed in claim 13, wherein on the application controller of the multi-card MMI, the non-predetermined SIM card is represented by the candidate identification symbol, and when communication apparatus detects that the candidate identification symbol has been selected by the subscriber, at least one part of the non-predetermined SIM card is displayed for selection of the subscriber.

* * * * *